US009800275B2

(12) United States Patent
Choi et al.

(10) Patent No.: US 9,800,275 B2
(45) Date of Patent: Oct. 24, 2017

(54) SYSTEMS AND METHODS FOR OUT-OF BAND-INTERFERENCE MITIGATION

(71) Applicant: Kumu Networks, Inc., Sunnyvale, CA (US)

(72) Inventors: Jung-Il Choi, Saratoga, CA (US); Mayank Jain, San Jose, CA (US)

(*) Notice: Subject to any disclaimer, the term of this patent is extended or adjusted under 35 U.S.C. 154(b) by 0 days.

(21) Appl. No.: 15/378,180

(22) Filed: Dec. 14, 2016

(65) Prior Publication Data
US 2017/0179983 A1    Jun. 22, 2017

Related U.S. Application Data

(60) Provisional application No. 62/268,400, filed on Dec. 16, 2015.

(51) Int. Cl.
*H04B 1/38* (2015.01)
*H04L 5/16* (2006.01)
(Continued)

(52) U.S. Cl.
CPC ......... *H04B 1/0475* (2013.01); *H04B 1/1027* (2013.01); *H04B 2001/0491* (2013.01); (Continued)

(58) Field of Classification Search
USPC ....... 375/219, 220, 221, 222, 229–236, 240, 375/240.26, 240.27, 259, 285, 284, 278, (Continued)

(56) References Cited

U.S. PATENT DOCUMENTS 3,922,617 A   11/1975   Denniston et al.
4,321,624 A   3/1982    Gibson et al.
(Continued)

FOREIGN PATENT DOCUMENTS

EP   0755141    1/1997
EP   1959625    2/2009
(Continued)

OTHER PUBLICATIONS

Bharadia et al., "Full Duplex Radios" SIGOMM, Aug. 12-16 2013, Hong Kong, China, Copyright 2013 ACM 978-1-4503-2056-6/6/ 13/08, 12 pages.
Mcmichael et al., "Optimal Tuning of Analog Self-Interference Cancellers for Full-Duple Wireless Communication", Oct. 1-5, 2012, Fiftieth Annual Allerton Conference, Illinois, USA, pp. 246-251.

*Primary Examiner* — Linda Wong
(74) *Attorney, Agent, or Firm* — Jeffrey Schox; Thomas Gwinn

(57) ABSTRACT

A system for interference mitigation including a transmit coupler that samples the RF transmit signal to create a sampled RF transmit signal; a transmit analog canceller that transforms the RF transmit signal to an RF interference cancellation signal, according to a first configuration state; a first receive coupler that combines the RF interference cancellation signal and the RF receive signal to generate a composite RF receive signal; a sampling analog canceller that transforms the RF transmit signal to a RF interference cancellation signal, according to a second configuration state; a cleaning coupler that combines the RF transmit signal and the second RF interference cancellation signal; a first frequency downconverter that converts the transmit signal to a BB transmit signal; a second frequency downconverter that converts the composite RF receive signal to a composite BB receive signal; an analog-to-digital converter that converts the transmit signal to a digital transmit signal.

19 Claims, 15 Drawing Sheets

(51) Int. Cl.
*H04B 1/04* (2006.01)
*H04B 1/10* (2006.01)

(52) U.S. Cl.
CPC .............. *H04B 2001/1045* (2013.01); *H04B 2001/1072* (2013.01)

(58) Field of Classification Search
USPC ........ 375/295, 296, 316, 340, 346, 354, 358
See application file for complete search history.

(56) References Cited

U.S. PATENT DOCUMENTS

| | | | |
|---|---|---|---|
| 4,952,193 A | 8/1990 | Talwar | |
| 5,212,827 A | 5/1993 | Meszko et al. | |
| 5,691,978 A | 11/1997 | Kenworthy | |
| 5,734,967 A | 3/1998 | Kotzin et al. | |
| 5,790,658 A | 8/1998 | Yip et al. | |
| 5,818,385 A | 10/1998 | Bartholomew | |
| 5,930,301 A | 7/1999 | Chester et al. | |
| 6,215,812 B1 | 4/2001 | Young et al. | |
| 6,240,150 B1 | 5/2001 | Darveau et al. | |
| 6,411,250 B1 | 6/2002 | Oswald et al. | |
| 6,539,204 B1 | 3/2003 | Marsh et al. | |
| 6,567,649 B2 | 5/2003 | Souissi | |
| 6,580,771 B2 | 6/2003 | Kenney | |
| 6,639,551 B2 | 10/2003 | Li et al. | |
| 6,657,950 B1 | 12/2003 | Jones, IV et al. | |
| 6,686,879 B2 | 2/2004 | Shattil | |
| 6,725,017 B2 | 4/2004 | Blount et al. | |
| 6,907,093 B2 | 6/2005 | Blount et al. | |
| 6,915,112 B1 | 7/2005 | Sutton et al. | |
| 6,965,657 B1 | 11/2005 | Rezvani et al. | |
| 6,985,705 B2 | 1/2006 | Shohara | |
| 7,057,472 B2 | 6/2006 | Fukamachi et al. | |
| 7,139,543 B2 | 11/2006 | Shah | |
| 7,177,341 B2 | 2/2007 | McCorkle | |
| 7,228,104 B2 | 6/2007 | Collins et al. | |
| 7,266,358 B2 | 9/2007 | Hillstrom | |
| 7,302,024 B2 | 11/2007 | Arambepola | |
| 7,336,128 B2 | 2/2008 | Suzuki et al. | |
| 7,336,940 B2 | 2/2008 | Smithson | |
| 7,348,844 B2 | 3/2008 | Jaenecke | |
| 7,349,505 B2 | 3/2008 | Blount et al. | |
| 7,362,257 B2 | 4/2008 | Bruzzone et al. | |
| 7,372,420 B1 | 5/2008 | Osterhues et al. | |
| 7,397,843 B2 | 7/2008 | Grant et al. | |
| 7,426,242 B2 | 9/2008 | Thesling | |
| 7,508,898 B2 | 3/2009 | Cyr et al. | |
| 7,509,100 B2 | 3/2009 | Toncich | |
| 7,706,755 B2 | 4/2010 | Muhammad et al. | |
| 7,733,813 B2 | 6/2010 | Shin et al. | |
| 7,773,759 B2 | 8/2010 | Alves et al. | |
| 7,773,950 B2 | 8/2010 | Wang et al. | |
| 7,778,611 B2 | 8/2010 | Asai et al. | |
| 7,869,527 B2 | 1/2011 | Vetter et al. | |
| 7,948,878 B2 | 5/2011 | Briscoe et al. | |
| 7,962,170 B2 | 6/2011 | Axness et al. | |
| 7,987,363 B2 | 7/2011 | Chauncey et al. | |
| 7,999,715 B2 | 8/2011 | Yamaki et al. | |
| 8,005,235 B2 | 8/2011 | Rebandt, II et al. | |
| 8,023,438 B2 | 9/2011 | Kangasmaa et al. | |
| 8,027,642 B2 | 9/2011 | Proctor, Jr. et al. | |
| 8,031,744 B2 | 10/2011 | Radunovic et al. | |
| 8,032,183 B2 | 10/2011 | Rudrapatna | |
| 8,055,235 B1 | 11/2011 | Gupta et al. | |
| 8,060,803 B2 | 11/2011 | Kim | |
| 8,081,695 B2 | 12/2011 | Chrabieh et al. | |
| 8,085,831 B2 | 12/2011 | Teague | |
| 8,086,191 B2 | 12/2011 | Fukuda et al. | |
| 8,090,320 B2 | 1/2012 | Dent et al. | |
| 8,155,046 B2 | 4/2012 | Jung et al. | |
| 8,155,595 B2 | 4/2012 | Sahin et al. | |
| 8,160,176 B2 | 4/2012 | Dent et al. | |
| 8,175,535 B2 | 5/2012 | Mu | |
| 8,179,990 B2 | 5/2012 | Orlik et al. | |
| 8,218,697 B2 | 7/2012 | Guess et al. | |
| 8,270,456 B2 | 9/2012 | Leach et al. | |
| 8,274,342 B2 | 9/2012 | Tsutsumi et al. | |
| 8,306,480 B2 | 11/2012 | Muhammad et al. | |
| 8,331,477 B2 | 12/2012 | Huang et al. | |
| 8,349,933 B2 | 1/2013 | Bhandari et al. | |
| 8,351,533 B2 | 1/2013 | Shrivastava et al. | |
| 8,385,855 B2 | 2/2013 | Lorg et al. | |
| 8,385,871 B2 | 2/2013 | Wyville | |
| 8,391,878 B2 | 3/2013 | Tenny | |
| 8,417,750 B2 | 4/2013 | Yan et al. | |
| 8,422,540 B1 | 4/2013 | Negus et al. | |
| 8,428,542 B2 | 4/2013 | Bornazyan | |
| 8,446,892 B2 | 5/2013 | Ji et al. | |
| 8,457,549 B2 | 6/2013 | Weng et al. | |
| 8,462,697 B2 | 6/2013 | Park et al. | |
| 8,467,757 B2 | 6/2013 | Ahn | |
| 8,498,585 B2 | 7/2013 | Vandenameele | |
| 8,502,924 B2 | 8/2013 | Liou et al. | |
| 8,509,129 B2 | 8/2013 | Deb et al. | |
| 8,521,090 B2 | 8/2013 | Kim et al. | |
| 8,576,752 B2 | 11/2013 | Sarca | |
| 8,611,401 B2 | 12/2013 | Lakkis | |
| 8,619,916 B2 | 12/2013 | Jong | |
| 8,625,686 B2 | 1/2014 | Li et al. | |
| 8,626,090 B2 | 1/2014 | Dalipi | |
| 8,649,417 B2 | 2/2014 | Baldemair et al. | |
| 8,711,943 B2 | 4/2014 | Rossato et al. | |
| 8,744,377 B2 | 6/2014 | Rimini et al. | |
| 8,750,786 B2 | 6/2014 | Larsson et al. | |
| 8,755,756 B1 | 6/2014 | Zhang et al. | |
| 8,767,869 B2 | 7/2014 | Rimini et al. | |
| 8,787,907 B2 | 7/2014 | Jain et al. | |
| 8,798,177 B2 | 8/2014 | Park et al. | |
| 8,804,975 B2 | 8/2014 | Harris et al. | |
| 8,837,332 B2 | 9/2014 | Khojastepour et al. | |
| 8,842,584 B2 | 9/2014 | Jana et al. | |
| 8,879,433 B2 | 11/2014 | Khojastepour et al. | |
| 8,879,811 B2 | 11/2014 | Liu et al. | |
| 8,913,528 B2 | 12/2014 | Cheng et al. | |
| 8,929,550 B2 | 1/2015 | Shattil et al. | |
| 8,995,410 B2 | 3/2015 | Balan | |
| 9,014,069 B2 | 4/2015 | Patil et al. | |
| 9,019,849 B2 | 4/2015 | Hui et al. | |
| 9,031,567 B2 | 5/2015 | Haub | |
| 9,042,838 B2 | 5/2015 | Braithwaite | |
| 9,054,795 B2 | 6/2015 | Choi et al. | |
| 9,077,421 B1 | 7/2015 | Mehlman et al. | |
| 9,112,476 B2 | 8/2015 | Basaran et al. | |
| 9,124,475 B2 | 9/2015 | Li et al. | |
| 9,130,747 B2 | 9/2015 | Zinser et al. | |
| 9,136,883 B1 | 9/2015 | Moher et al. | |
| 9,160,430 B2 | 10/2015 | Maltsev et al. | |
| 9,184,902 B2 | 11/2015 | Khojastepour et al. | |
| 9,185,711 B2 | 11/2015 | Lin et al. | |
| 9,231,647 B2 | 1/2016 | Polydoros et al. | |
| 9,231,712 B2 | 1/2016 | Hahn et al. | |
| 9,236,996 B2 | 1/2016 | Khandani | |
| 9,264,024 B2 | 2/2016 | Shin et al. | |
| 9,312,895 B1 | 4/2016 | Gupta et al. | |
| 9,325,432 B2 | 4/2016 | Hong et al. | |
| 9,331,737 B2 | 5/2016 | Hong et al. | |
| 9,413,500 B2 | 8/2016 | Chincholi et al. | |
| 9,413,516 B2 | 8/2016 | Khandani | |
| 9,461,698 B2 | 10/2016 | Moffatt et al. | |
| 9,490,963 B2 | 11/2016 | Choi et al. | |
| 9,537,543 B2 | 1/2017 | Choi | |
| 2010/0197231 A1* | 8/2010 | Kenington | H04B 1/525 455/63.1 |
| 2010/0278085 A1* | 11/2010 | Hahn | H04B 1/525 370/286 |
| 2013/0077502 A1* | 3/2013 | Gainey | H04B 7/15578 370/252 |
| 2013/0102254 A1* | 4/2013 | Cyzs | H04B 1/126 455/63.1 |
| 2013/0142030 A1* | 6/2013 | Parnaby | H04B 3/23 370/201 |
| 2014/0269991 A1* | 9/2014 | Aparin | H04B 1/0475 375/297 |

(56) References Cited

U.S. PATENT DOCUMENTS

| | | | | |
|---|---|---|---|---|
| 2015/0103745 A1* | 4/2015 | Negus | ............... | H04B 15/00 370/328 |
| 2016/0043759 A1* | 2/2016 | Choi | ............... | H04L 5/143 375/346 |
| 2016/0056846 A1* | 2/2016 | Moher | ............... | H04B 1/0042 375/297 |
| 2016/0105213 A1* | 4/2016 | Hua | ............... | H04B 1/525 370/278 |
| 2016/0119019 A1* | 4/2016 | Pratt | ............... | H04B 1/525 370/278 |
| 2016/0266245 A1* | 9/2016 | Bharadia | ............... | G01S 7/038 |
| 2016/0269061 A1* | 9/2016 | Hwang | ............... | H04B 1/1036 |
| 2016/0285486 A1* | 9/2016 | Qin | ............... | H04B 1/1027 |
| 2016/0294425 A1* | 10/2016 | Hwang | ............... | H04B 1/525 |
| 2016/0344432 A1* | 11/2016 | Hwang | ............... | H04B 1/525 |
| 2016/0380706 A1* | 12/2016 | Tanzi | ............... | H04B 1/123 455/78 |
| 2017/0041095 A1* | 2/2017 | Hwang | ............... | H04B 1/0475 |

FOREIGN PATENT DOCUMENTS

| | | |
|---|---|---|
| EP | 2237434 | 10/2010 |
| EP | 2267946 | 12/2010 |
| RU | 2256985 | 7/2005 |
| WO | 173250 | 11/2013 |
| WO | 185106 | 12/2013 |
| WO | 093916 | 6/2014 |

* cited by examiner

PRIOR ART

SYSTEMS AND METHODS FOR OUT-OF BAND-INTERFERENCE MITIGATION

CROSS REFERENCE TO RELATED APPLICATIONS

This application claims the benefit of U.S. Provisional Application Ser. No. 62/268,400, filed on 16 Dec. 2015, which is incorporated in its entirety by this reference.

TECHNICAL FIELD

This invention relates generally to the wireless communications field, and more specifically to new and useful systems and methods for out-of-band interference mitigation.

BACKGROUND

Traditional wireless communication systems are half-duplex; that is, they are not capable of transmitting and receiving signals simultaneously on a single wireless communications channel. One way that this issue is addressed is through the use of frequency division multiplexing (FDM), in which transmission and reception occur on different frequency channels. Unfortunately, the performance of FDM-based communication is limited by the issue of adjacent-channel interference (ACI), which occurs when a transmission on a first frequency channel contains non-negligible strength in another frequency channel used by a receiver. ACI may be addressed by increasing channel separation, but this in turn limits the bandwidth available for use in a given area. ACI may also be addressed by filtering, but the use of filters alone may result in inadequate performance for many applications. Thus, there is a need in the wireless communications field to create new and useful systems and methods for out-of-band interference mitigation. This invention provides such new and useful systems and methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Out-Of-Band Interference Mitigation Systems

A system 1000 for out-of-band interference mitigation includes a receive band interference cancellation system (RxICS) 1300 and at least one of a transmit band interference cancellation system (TxICS) 1100 and a transmit band interference filtering system (TxIFS) 1200. The system 1000 may additionally or alternatively include a receive band filtering system (RxIFS) 1400. The system 1000 may additionally include any number of additional elements to enable interference cancellation and/or filtering, including signal couplers 1010, amplifiers 1020, frequency upconverters 1030, frequency downconverters 1040, analog-to-digital converters (ADC) 1050, digital-to-analog converters (DAC) 1060, time delays 1070, and any other circuit components (e.g., phase shifters, attenuators, transformers, filters, etc.).

The system 1000 is preferably implemented using digital and/or analog circuitry. Digital circuitry is preferably implemented using a general-purpose processor, a digital signal processor, an application specific integrated circuit (ASIC), a field programmable gate array (FPGA) and/or any suitable processor(s) or circuit(s). Analog circuitry is preferably implemented using analog integrated circuits (ICs) but may additionally or alternatively be implemented using discrete components (e.g., capacitors, resistors, transistors), wires, transmission lines, waveguides, digital components, mixed-signal components, or any other suitable components. The system 1000 preferably includes memory to store configuration data, but may additionally or alternatively be configured using externally stored configuration data or in any suitable manner.

The system 1000 functions to reduce interference present in a communications receiver resulting from transmission of a nearby transmitter on an adjacent communications channel (e.g., adjacent-channel interference). Adjacent-channel interference may result from either or both of a receiver receiving transmissions outside of a desired receive channel and a transmitter transmitting (either intentionally or via leakage) on the desired receive channel.

Figure 1:
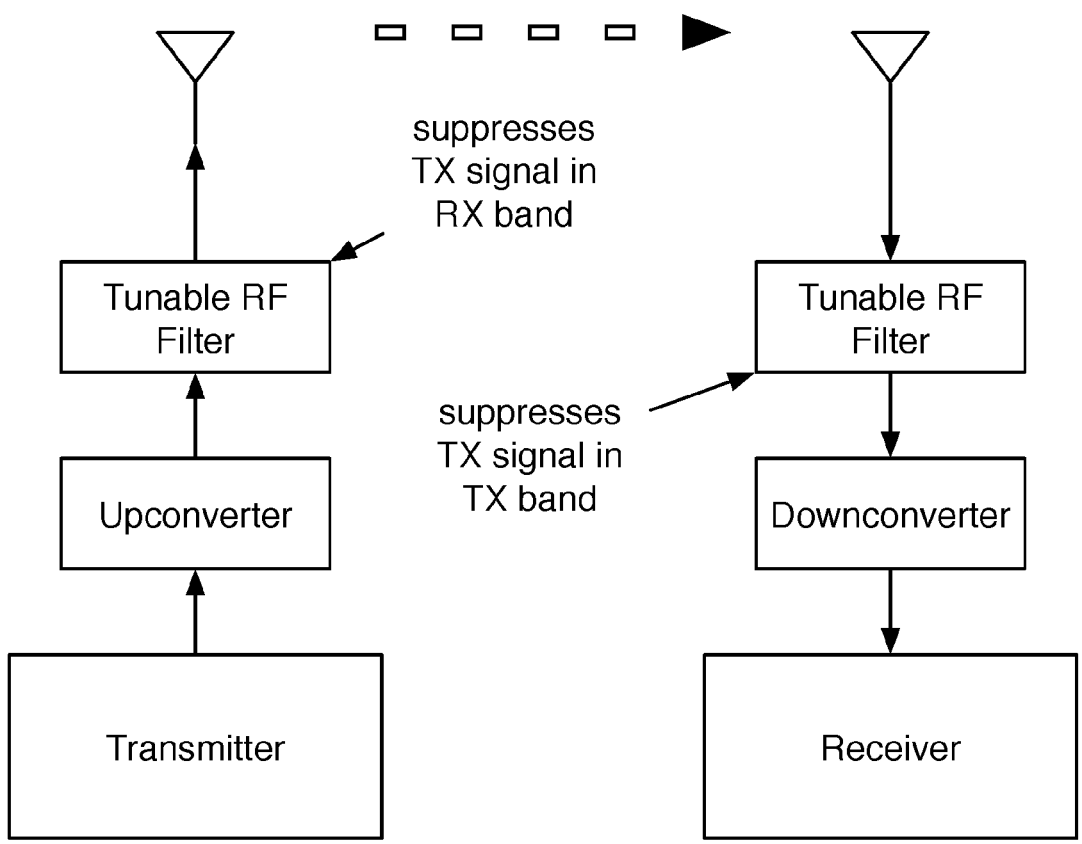
FIG. 1 is a prior art representation of out-of-band interference mitigation.

Traditionally, adjacent-channel interference has been mitigated using tunable or selectable filter-based architectures; for example, as shown in FIG. 1. On the transmit side, the tunable radio frequency (RF) filter is used to suppress the transmit signal in the receive band (e.g., a bandpass filter that only lets the transmit band pass). On the receive side, the tunable RF filter is generally used to suppress interference due to the transmitted signal in the transmit band (e.g., a bandpass filter that only lets the receive band pass). In some cases, this filter may also be used to selectively filter signal in the receive band as well.

This purely filter-based approach is limited primarily by its ability to remove interference in the receive band. Filtering in the receive band primarily occurs at the transmit side. Since, frequently, out-of-channel signal results from non-linear processes such as amplification, this filtering must generally occur at RF and after power amplification, which means that the transmit filter must both be able to reject a large amount of signal out-of-band without a large insertion loss. In other words, in these cases the filter must generally have a high quality factor (Q factor, Q), high insertion loss, or low interference rejection ability.

Likewise, the RF filter on the receive side must also be able to reject a large amount of signal out-of-band (since the transmit side filter does not filter the transmit band signal), and so it must also have high Q, high insertion loss, or low interference rejection ability. Note that these limitations are especially apparent in cases where the transmit and receive antennas are nearby (i.e., antenna isolation is low), because the amount of power that must be rejected by the RF filters increases; or when channel separation is small (and therefore filter Q must be higher).

The system 1000 provides improved interference mitigation by performing interference cancellation either as a substitute for or in addition to interference filtering. The system 1000 uses a receive band interference cancellation system (RxICS 1300) to remove interference in the receive band, as well as either or both of the transmit band interference cancellation system (TxICS 1100) and transmit band interference filtering system (TxIFS 1200) to remove interference in the transmit band.

The system 1000 may be arranged in various architectures including these elements, enabling flexibility for a number of applications. In some embodiments, the system 1000 may be attached or coupled to existing transceivers; additionally or alternatively, the system 1000 may be integrated into transceivers. Examples of architectures of the system 1000 are as shown in FIGS. 2-7.

Figure 2:
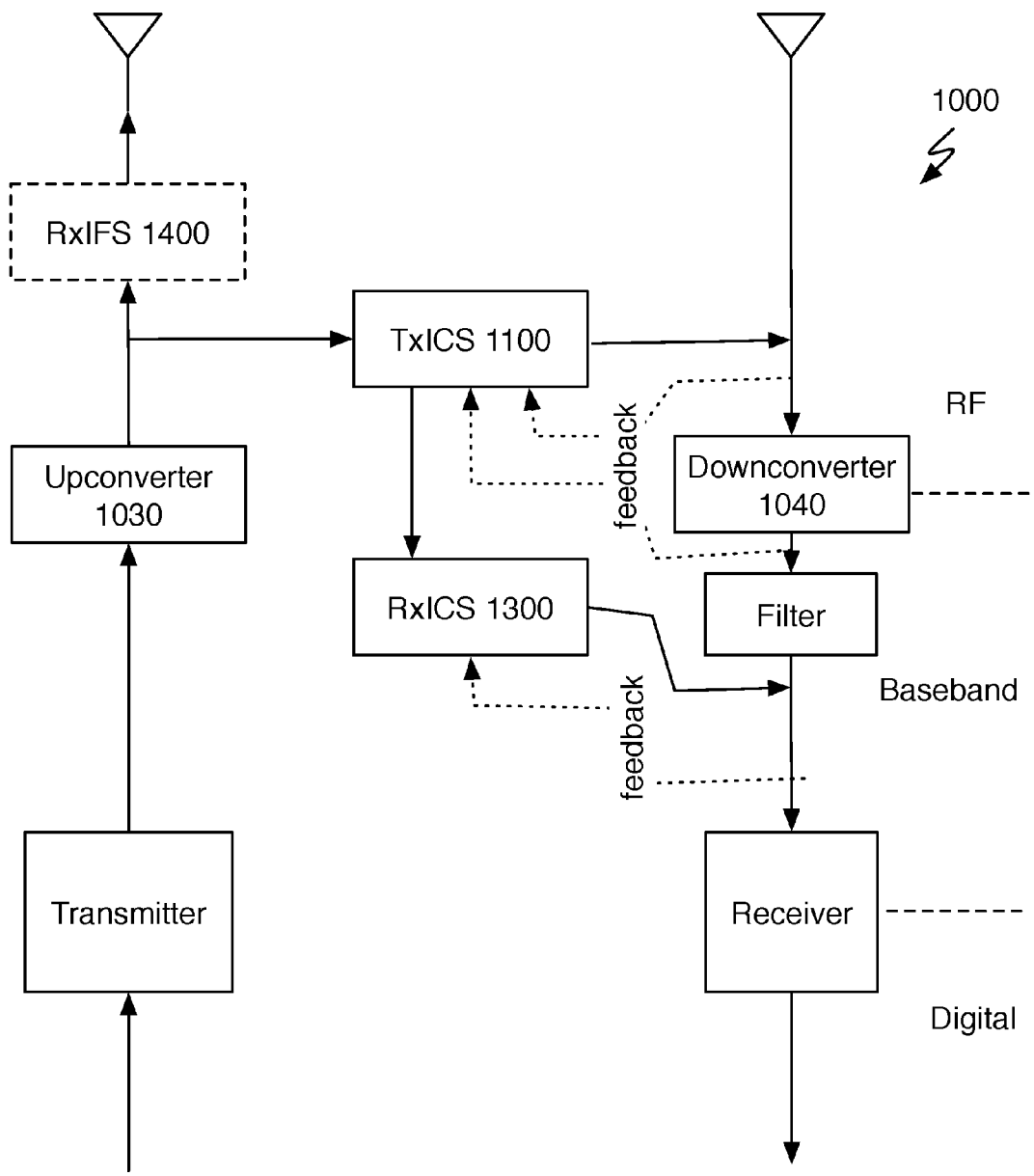
FIG. 2 is a diagram representation of a system of a preferred embodiment.

As shown in FIG. 2, the system 1000 may mitigate interference using the TxICS 1100 and RxICS 1300 (as well as optionally the RxIFS 1400), combining the RxICS 1300 interference cancellation with a baseband receive signal.

Figure 3:
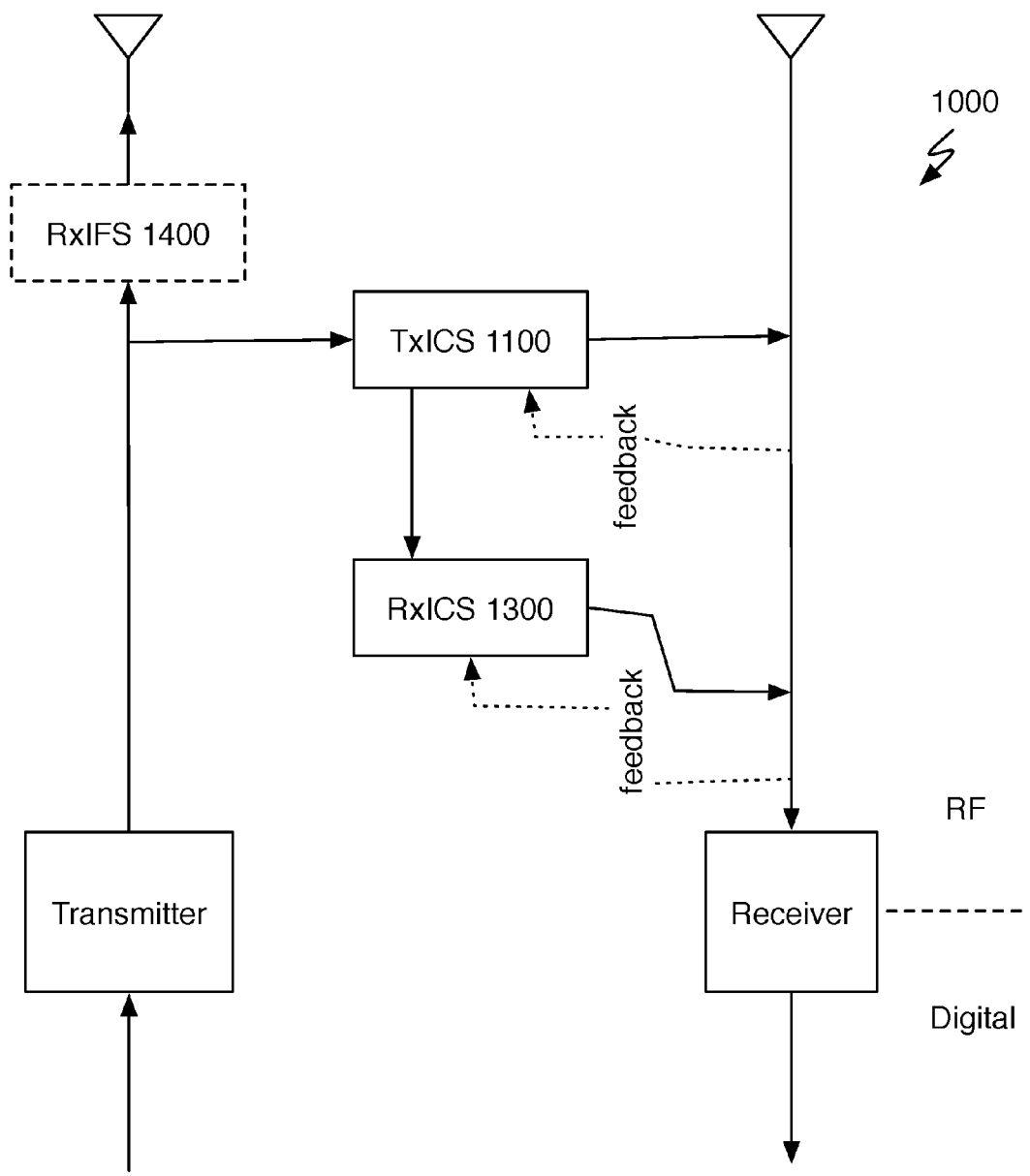
FIG. 3 is a diagram representation of a system of a preferred embodiment.

As shown in FIG. 3, the system 1000 may mitigate interference using the TxICS 1100 and RxICS 1300 (as well as optionally the RxIFS 1400), combining the RxICS 1300 interference cancellation with an RF receive signal.

Figure 4:
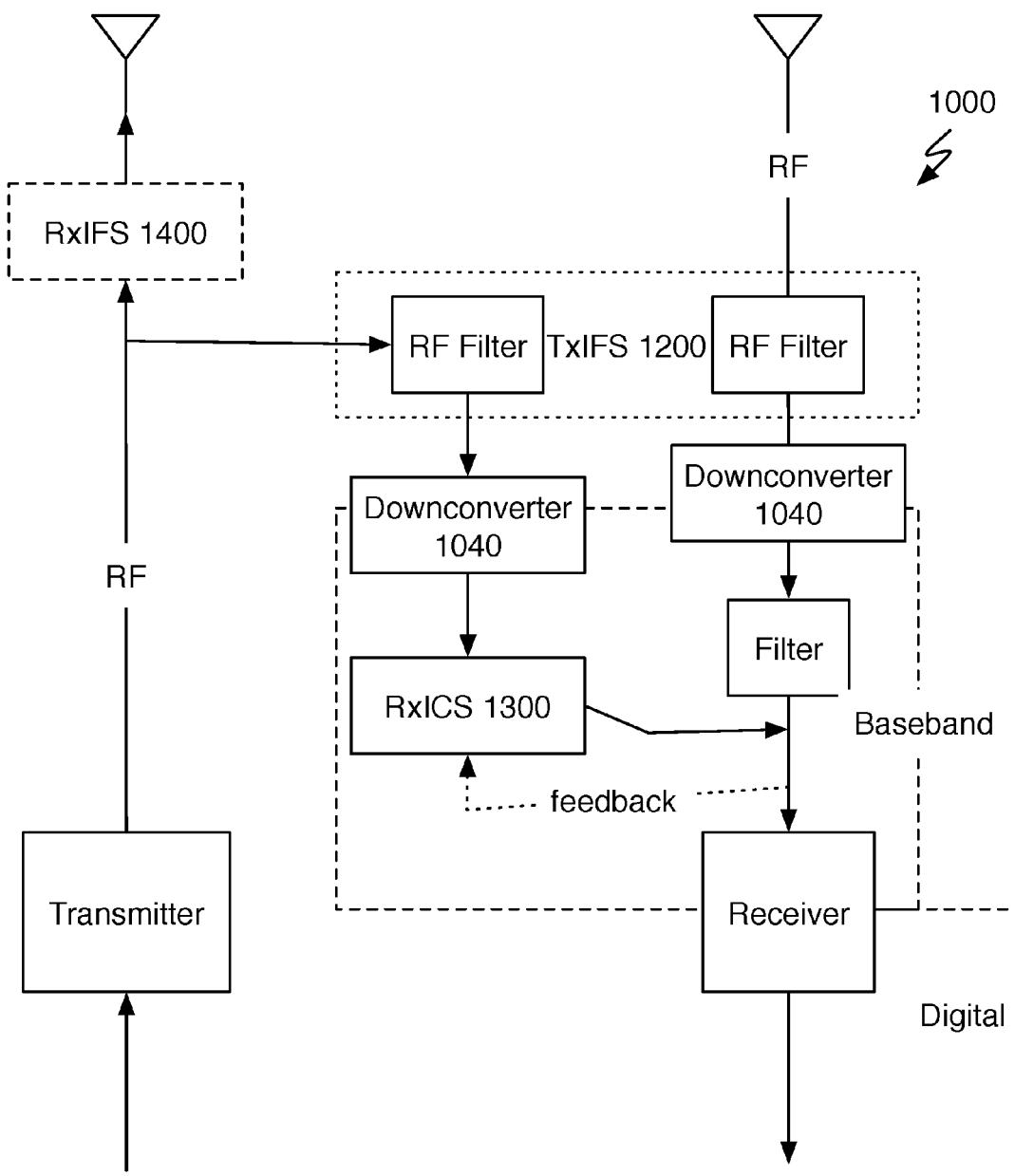
FIG. 4 is a diagram representation of a system of a preferred embodiment.

As shown in FIG. 4, the system 1000 may mitigate interference using the TxIFS 1200 and RxICS 1300 (as well as optionally the RxIFS 1400), combining the RxICS 1300 interference cancellation with a baseband receive signal.

Figure 5:
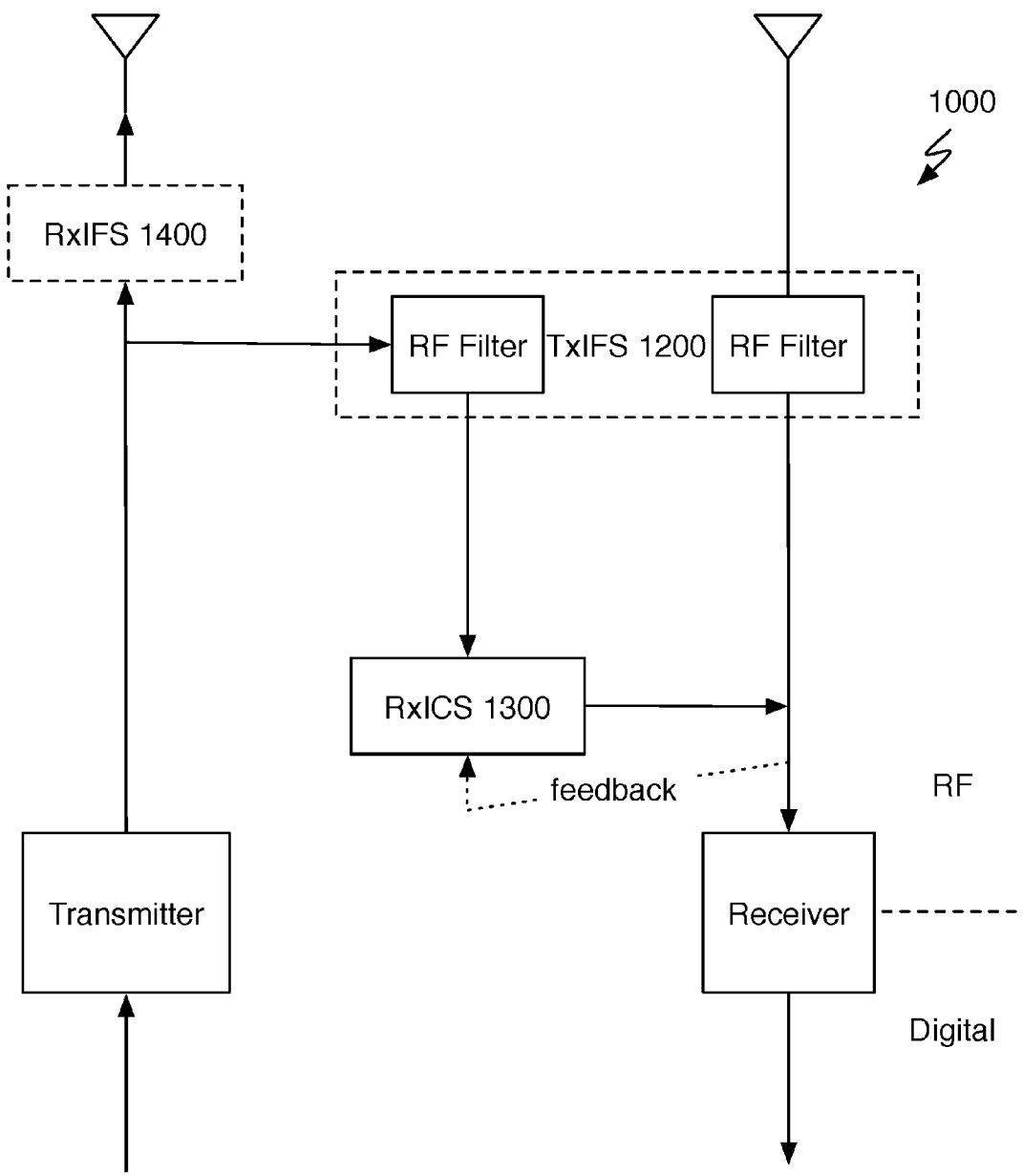
FIG. 5 is a diagram representation of a system of a preferred embodiment.

As shown in FIG. 5, the system 1000 may mitigate interference using the TxIFS 1200 and RxICS 1300 (as well as optionally the RxIFS 1400), combining the RxICS 1300 interference cancellation with an RF receive signal.

Figure 6:
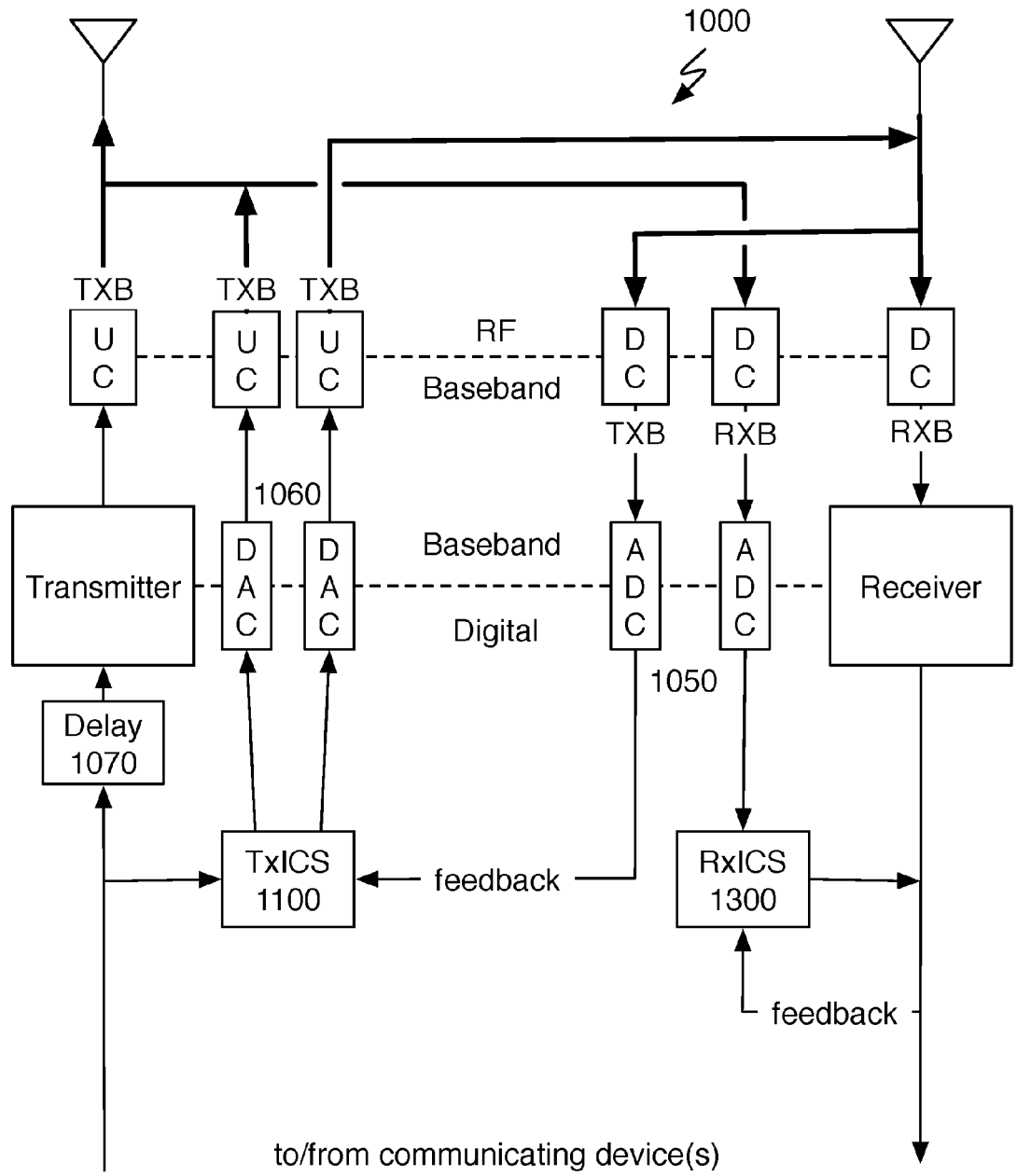
FIG. 6 is a diagram representation of a system of a preferred embodiment.

As shown in FIG. 6, the system 1000 may mitigate interference using the TxICS 1100 and RxICS 1300, combining the RxICS 1300 interference cancellation with a digital receive signal.

Figure 7:
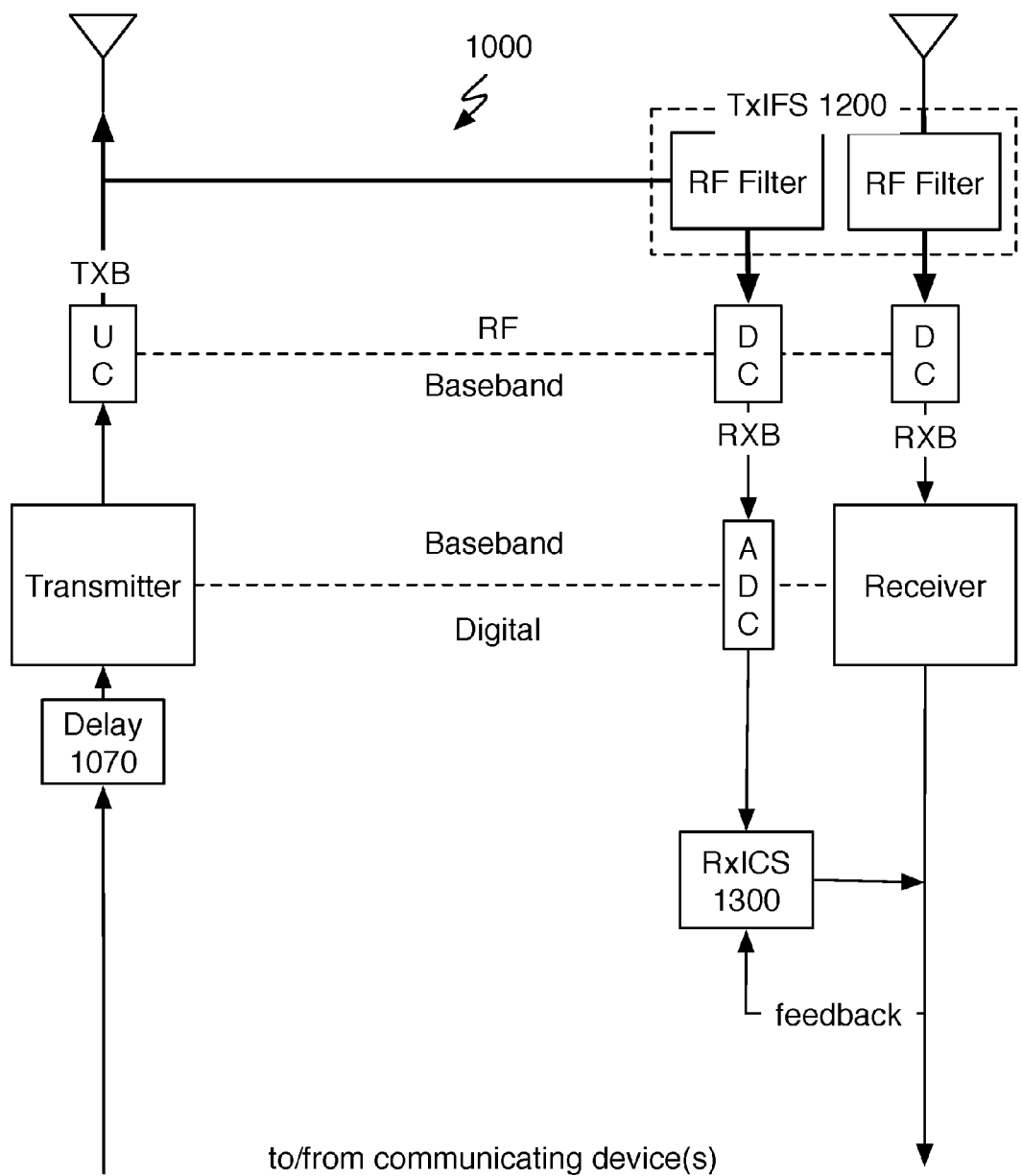
FIG. 7 is a diagram representation of a system of a preferred embodiment.

As shown in FIG. 7, the system 1000 may mitigate interference using the TxIFS 1200 and RxICS 1300, combining the RxICS 1300 interference cancellation with a digital receive signal.

Figure 8:
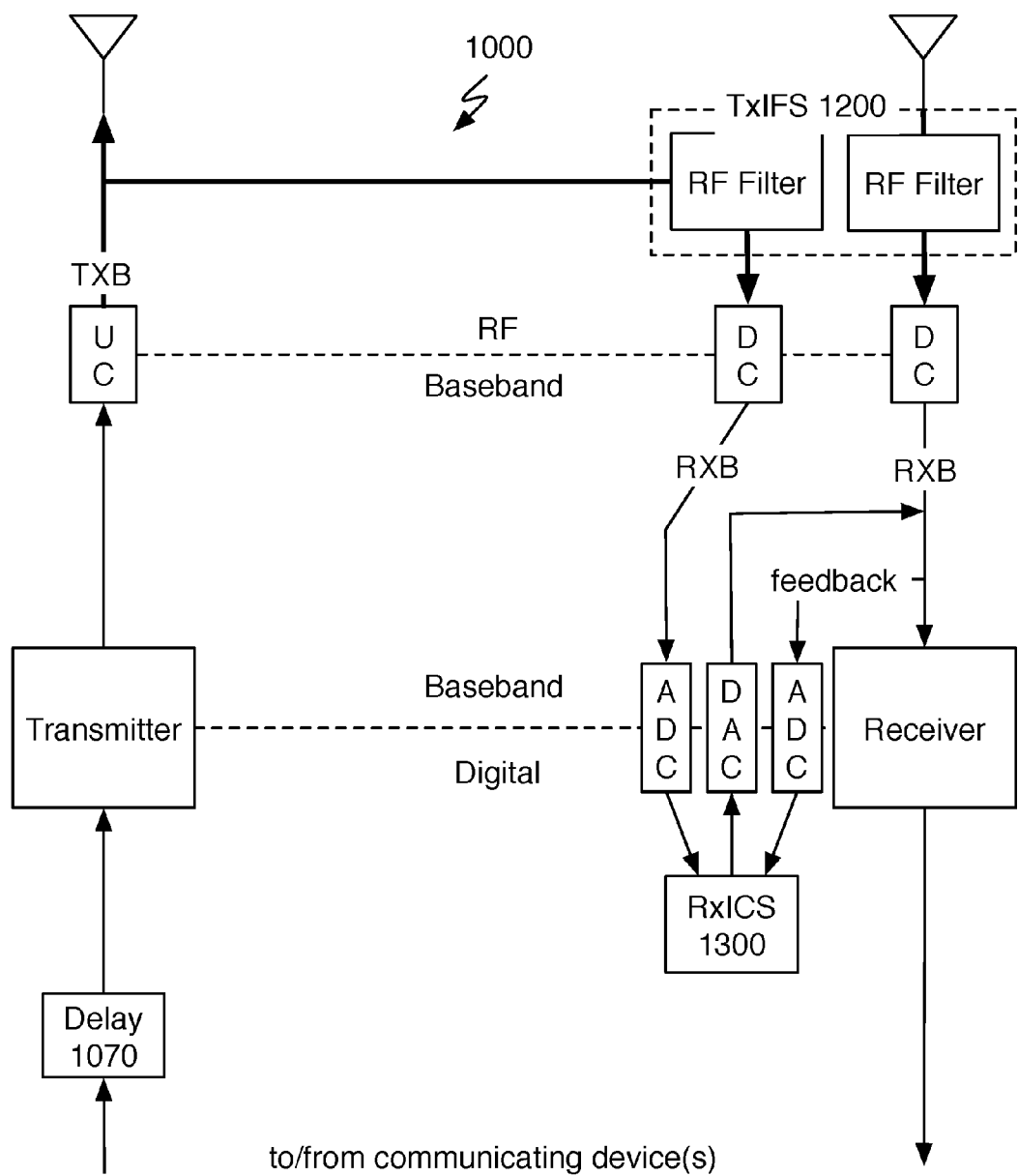
FIG. 8 is a diagram representation of a system of a preferred embodiment.

As shown in FIG. 8, the system 1000 may mitigate interference using the TxIFS 1200 and RxICS 1300, combining the RxICS 1300 interference cancellation with an analog receive signal.

In one implementation of a preferred embodiment, the RxICS 1300 can include a switchable output, enabling combination of the RxICS 1300 interference cancellation with a digital receive signal, an analog receive signal, and/or an RF receive signal. The RxICS 1300 may include an RxDC 1310 with an output switchable between a digital ouput, a baseband analog output (after digital-to-analog conversion), and an IF/RF analog output (after frequency upconversion of the analog output). Additionally or alternatively, the RxICS 1300 may include an RxAC 1320 with an output switchable between an RF output, a baseband/IF analog output (after frequency downconversion of the RF output), and a digital output (after analog-to-digital conversion of the analog output). Selection of which interference cancellation output to combine with the appropriate receive signal is preferably performed by a tuning circuit, but can additionally or alternatively be performed by any suitable controller. In this implementation, the tuning circuit preferably receives feedback signals from the receive path at the RF, baseband, and digital signal paths, and the output is selected (e.g., by the tuning circuit) according to changes in the feedback signal that are indicative of optimal interference-cancellation performance. Similarly, the TxICS 1100 can include a switchable output as described above, but directed to performing interference cancellation in the transmit band in lieu of the receive band.

The system 1000 is preferably coupled to or integrated with a receiver that functions to receive analog receive signals transmitted over a communications link (e.g., a wireless channel, a coaxial cable). The receiver preferably converts analog receive signals into digital receive signals for processing by a communications system, but may additionally or alternatively not convert analog receive signals (passing them through directly without conversion).

The receiver is preferably coupled to the communications link by a duplexer-coupled RF antenna, but may additionally or alternatively be coupled to the communications link in any suitable manner. Some examples of alternative couplings include coupling via one or more dedicated receive antennas. In another alternative coupling, the receiver may be coupled to the communications link by a circulator-coupled RF antenna.

The receiver preferably includes an ADC 1050 (described in following sections) and converts baseband analog signals to digital signals. The receiver may additionally or alternatively include an integrated amplifier 1020 and/or a frequency downconverter 1040 (enabling the receiver to convert RF or other analog signals to digital).

The system 1000 is preferably coupled to or integrated with a transmitter that functions to transmit signals of the communications system over a communications link to a second communications system. The transmitter preferably converts digital transmit signals into analog transmit signals.

The transmitter is preferably coupled to the communications link by a duplexer-coupled RF antenna, but may additionally or alternatively be coupled to the communications link in any suitable manner. Some examples of alternative couplings include coupling via one or more dedicated transmit antennas, dual-purpose transmit and/or receive antennas, or any other suitable antennas. In other alternative couplings, the transmitter may be coupled to the communications link by direct wired coupling (e.g., through one or more RF coaxial cables, transmission line couplers, etc.).

The transmitter preferably includes a DAC 1060 (described in following sections) and converts digital signals to baseband analog signals. The transmitter may additionally or alternatively include an integrated amplifier 1020 and/or a frequency upconverter 1030 (enabling the transmitter to convert digital signals to RF signals and/or intermediate frequency (IF) signals).

The transmitter and receiver may be coupled to the same communicating device or different communicating devices. In some variations, there may be multiple transmitters and/or receivers, which may be coupled to the same or different communication devices in any suitable combination.

Signal couplers 1010 function to allow analog signals to be split and/or combined. While not necessarily shown in the figures, signal couplers are preferably used at each junction (e.g., splitting, combining) of two or more analog signals; alternatively, analog signals may be coupled, joined, or split in any manner. In particular, signal couplers 1010 may be used to provide samples of transmit signals, as well as to combine interference cancellation signals with other signals (e.g., transmit or receive signals). Alternatively, signal couplers 1010 may be used for any purpose. Signal couplers 1010 may couple and/or split signals using varying amounts of power; for example, a signal coupler 1010 intended to sample a signal may have an input port, an output port, and a sample port, and the coupler 1010 may route the majority of power from the input port to the output port with a small amount going to the sample port (e.g., a 99.9%/0.1% power split between the output and sample port, or any other suitable split).

The signal coupler 1010 is preferably a short section directional transmission line coupler, but may additionally or alternatively be any power divider, power combiner, directional coupler, or other type of signal splitter. The signal coupler 130 is preferably a passive coupler, but may additionally or alternatively be an active coupler (for instance, including power amplifiers). For example, the signal coupler 1010 may comprise a coupled transmission line coupler, a branch-line coupler, a Lange coupler, a Wilkinson power divider, a hybrid coupler, a hybrid ring coupler, a multiple output divider, a waveguide directional coupler, a waveguide power coupler, a hybrid transformer coupler, a cross-connected transformer coupler, a resistive tee, and/or a resistive bridge hybrid coupler. The output ports of the signal coupler 1010 are preferably phase-shifted by ninety degrees, but may additionally or alternatively be in phase or phase shifted by a different amount.

Amplifiers 1020 function to amplify signals of the system 1000. Amplifiers may include any analog or digital amplifiers. Some examples of amplifiers 1020 include low-noise amplifiers (LNA) typically used to amplify receive signals and power amplifiers (PA) typically used to amplify transmit signals prior to transmission.

Frequency upconverters 1030 function to upconvert a carrier frequency of an analog signal (typically from baseband to RF, but alternatively from any frequency to any other higher frequency). Upconverters 1030 preferably accomplish signal upconversion using heterodyning methods, but may additionally or alternatively use any suitable upconversion methods.

The upconverter 1030 preferably includes a local oscillator (LO), a mixer, and a bandpass filter. The local oscillator functions to provide a frequency shift signal to the mixer; the mixer combines the frequency shift signal and the input signal to create (usually two, but alternatively any number) frequency shifted signals, one of which is the desired output signal, and the bandpass filter rejects signals other than the desired output signal.

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog integrated circuits (ICs), digital ICs, and/or any other suitable components. The mixer preferably functions to combine two or more electrical input signals into one or more composite outputs, where each output includes some characteristics of at least two input signals.

The bandpass filter is preferably a tunable bandpass filter centered around an adjustable radio frequency. Additionally or alternatively, the bandpass filter may be a bandpass filter centered around a set radio frequency, or any other suitable type of filter. The bandpass filter is preferably a passive filter, but may additionally or alternatively be an active filter. The bandpass filter is preferably implemented with analog circuit components, but may additionally or alternatively be digitally implemented.

In variations in which the bandpass filter is tunable, the center frequency of each tunable filter is preferably controlled by a control circuit or tuning circuit, but may additionally or alternatively be controlled by any suitable system (including manually controlled, e.g. as in a mechanically tuned capacitor). Each tunable bandpass filter preferably has a set quality (Q) factor, but may additionally or alternatively have a variable Q factor. The tunable bandpass filters may have different Q factors; for example, some of the tunable filters may be high-Q, some may be low-Q, and some may be no-Q (flat response).

Frequency downconverters 1040 function to downconvert the carrier frequency of an analog signal (typically to baseband, but alternatively to any frequency lower than the carrier frequency). The downconverter 1040 preferably accomplishes signal downconversion using heterodyning methods, but may additionally or alternatively use any suitable downconversion methods.

The downconverter 1040 preferably includes a local oscillator (LO), a mixer, and a baseband filter. The local oscillator functions to provide a frequency shift signal to the mixer; the mixer combines the frequency shift signal and the input signal to create (usually two) frequency shifted signals, one of which is the desired signal, and the baseband filter rejects signals other than the desired signal.

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog ICs, digital ICs, and/or any other suitable components. The mixer preferably functions to combine two or more electrical input signals into one or more composite outputs, where each output includes some characteristics of at least two input signals.

The baseband filter is preferably a lowpass filter with a tunable low-pass frequency. Additionally or alternatively, the baseband filter may be a lowpass filter with a set low-pass frequency, a bandpass filter, or any other suitable type of filter. The baseband filter is preferably a passive filter, but may additionally or alternatively be an active filter. The baseband filter is preferably implemented with analog circuit components, but may additionally or alternatively be digitally implemented.

While the bandpass filter of the frequency upconverter 1030 and the baseband filter of the frequency downconverter 1040 are necessary for performing frequency upconversion and downconversion, they also may be useful for filtering transmit and/or receive band signals. This is discussed in more detail in the sections on filtering and cancellation systems 1100, 1200, 1300, and 1400, but in general, the same filters that reject image frequencies generated by mixers may also reject signals outside of a desired band of interest.

For example, an RF receive signal may contain one or more signal components in a receive band (at 5690 MHz) and interference due to an undesired signal in a nearby transmit band (at 5670 MHz). When these signals are downconverted to baseband by a receiver (or other downconverter with an LO at the receive band frequency), they are first processed by the mixer, which generates four signals:

5690 MHz±5690 MHz and 5690 MHz±5670 MHz 0 MHz, 20 MHz, 11.38 GHz, 11.36 GHz

The 11 GHz frequencies are easily filtered by the filter of the downconverter, but the filter may additionally be used to filter out that 20 MHz signal as well (reducing transmit band presence in the baseband receive signal). In this way, frequency downconversion can be used to assist other filtering or interference cancellation systems of the system 1000.

Note that while the upconverter 1040 also performs filtering, and that filtering may be used to filter out undesired signals, filtering during upconversion may be less effective than filtering during downconversion. One reason for this is architecture-based; power amplification is typically performed after upconversion (and power amplification may amount for a large part of interference generation in other bands). That being said, it may still be useful to filter a signal prior to amplification, and noisy amplification is not always performed for all upconverted signals (e.g., digital transmit signal samples converted to RF). Another reason is that the upconverter bandpass frequency is centered around the RF frequency (or other frequency higher than baseband), which means that for a given amount of cancellation required, the filter must have a higher quality factor (Q).

For example, if a filter is desired to reject 30 dB at 20 MHz away from an RF center frequency of 5 GHz (that is, after upconversion or before downconversion), the Q of that filter must be higher than a low-pass filter desired to rejected 30 dB at 20 MHz away from baseband.

Analog-to-digital converters (ADCs) 1050 function to convert analog signals (typically at baseband, but additionally or alternatively at any frequency) to digital signals. ADCs 1050 may be any suitable analog-to-digital converter; e.g., a direct-conversion ADC, a flash ADC, a successive-approximation ADC, a ramp-compare ADC, a Wilkinson ADC, an integrating ADC, a delta-encoded ADC, a time-interleaved ADC, or any other suitable type of ADC.

Digital-to-analog converters (DACs) 1060 function to convert digital signals to analog signals (typically at baseband, but additionally or alternatively at any frequency). The DAC 1060 may be any suitable digital-to-analog converter; e.g., a pulse-width modulator, an oversampling DAC, a binary-weighted DAC, an R-2R ladder DAC, a cyclic DAC, a thermometer-coded DAC, or a hybrid DAC.

Time delays 1070 function to delay signal components. Delays 1070 may be implemented in analog (e.g., as a time delay circuit) or in digital (e.g., as a time delay function). Delays 1070 may be fixed, but may additionally or alternatively introduce variable delays. The delay 1070 is preferably implemented as an analog delay circuit (e.g., a bucket-brigade device, a long transmission line, a series of RC networks) but may additionally or alternatively be implemented in any other suitable manner. If the delay 1070 is a variable delay, the delay introduced may be set by a tuning circuit or other controller of the system 1000. Although not necessarily explicitly shown in figures, delays 1070 may be coupled to the system 1000 in a variety of ways to delay one signal relative to another. For example, delays 1070 may be used to delay a receive or transmit signal to account for time taken to generate an interference cancellation signal (so that the two signals may be combined with the same relative timing). Delays 1070 may potentially be implemented as part of or between any two components of the system 1000.

The TxICS 1100 functions to mitigate interference present in the transmit band of a signal using self-interference cancellation techniques; that is, generating a self-interference cancellation signal by transforming signal samples of a first signal (typically a transmit signal) into a representation of self-interference present in another signal (e.g., a receive signal, a transmit signal after amplification, etc.), due to transmission of the first signal and then subtracting that interference cancellation signal from the other signal.

The TxICS 1100 is preferably used to cancel interference present in the transmit band of a receive signal; i.e., the TxICs 1100 generates an interference cancellation signal from samples of a transmit signal using a circuit that models the representation of the transmit signal, in the transmit band, as received by a receiver, and subtracts that cancellation signal from the receive signal.

The TxICS 1100 may additionally be used to cancel interference present in the transmit band (TxB) of a transmit signal sample; i.e., the TxICS 1100 generates an interference cancellation signal from samples of a transmit signal using a circuit that models the representation of the transmit signal, in the transmit band, as generated by a transmitter (generally, but not necessarily, before transmission at an antenna), and subtracts that cancellation signal from the transmit signal sample. This type of interference cancellation is generally used to 'clean' a transmit signal sample; that is, to remove transmit band signal of a transmit sample, so that the sample contains primarily information in the receive band (allowing the sample to be used to perform receive-band interference cancellation, typically using the RxICS 1300).

The TxICS 1100 comprises at least one of a digital TX interference canceller (TxDC) 1110 and an analog TX interference canceller (TxAC) 1120. In the case that the TxICS 1100 performs both receive signal cancellation and transmit sample cancellation, the TxICS 1100 may include separate cancellers to perform these tasks; additionally or alternatively, the TxICS 1100 may include any number of cancellers for any purpose (e.g., one canceller performs both tasks, many cancellers perform a single task, etc.).

The TxDC 1110 functions to produce a digital interference cancellation signal from a digital input signal according to a digital transform configuration. The TxDC 1110 may be used to cancel interference in any signal, using any input, but the TxDC 1110 is preferably used to cancel transmit band interference in an analog receive signal (by converting a digital interference cancellation signal to analog using a DAC 1060 and combining it with the analog receive signal). The TxDC 1110 may also be used to cancel transmit band signal components in a transmit signal (to perform transmit signal cleaning as previously described).

Using upconverters 1030, downconverters 1040, ADCs 1050, and DACs 1060, the TxDC 1110 may convert analog signals of any frequency to digital input signals, and may additionally convert interference cancellation signals from digital to analog signals of any frequency.

The digital transform configuration of the TxDC 1110 includes settings that dictate how the TxDC 1110 transforms a digital transmit signal to a digital interference signal (e.g. coefficients of a generalized memory polynomial used to transform a transmit signal to an interference cancellation signal). The transform configuration for a TxDC 1110 is preferably set adaptively by a transform adaptor, but may additionally or alternatively be set by any component of the system 1000 (e.g., a tuning circuit) or fixed in a set transform configuration.

The TxDC 1110 is preferably substantially similar to the digital self-interference canceller of U.S. Provisional Application No. 62/268,388, the entirety of which is incorporated by this reference, except in that the TxDC 1110 is not necessarily applied solely to cancellation of interference in a receive signal resulting from transmission of another signal (as previously described).

Figure 9:
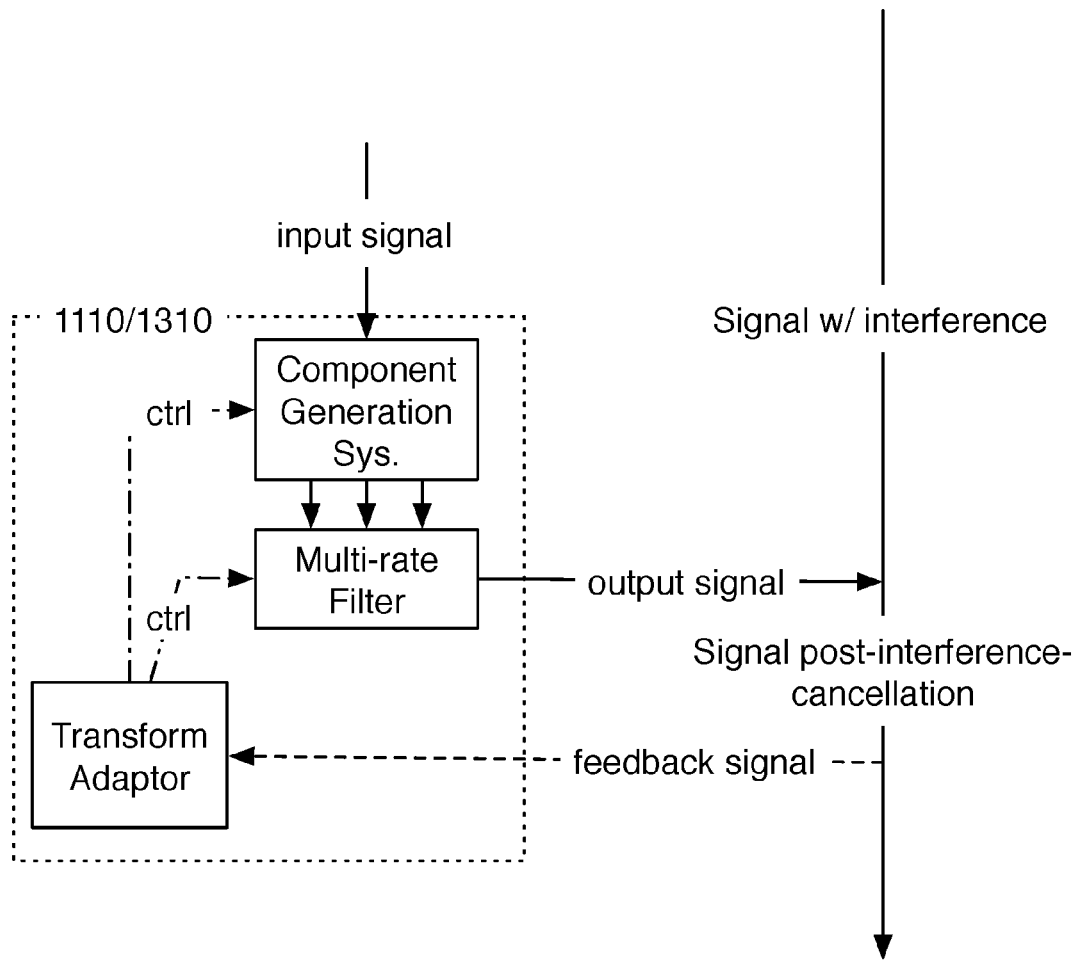
FIG. 9 is a diagram representation of a digital interference canceller of a system of a preferred embodiment.

In one implementation of a preferred embodiment, the TxDC 1110 includes a component generation system, a multi-rate filter, and a transform adaptor, as shown in FIG. 9.

The component generation system functions to generate a set of signal components from the sampled input signal (or signals) that may be used by the multi-rate filter to generate an interference cancellation signal. The component generation system preferably generates a set of signal components intended to be used with a specific mathematical model (e.g., generalized memory polynomial (GMP) models, Volterra models, and Wiener-Hammerstein models); additionally or alternatively, the component generation system may generate a set of signal components usable with multiple mathematical models.

In some cases, the component generator may simply pass a copy of a sampled transmit signal unmodified; this may be considered functionally equivalent to a component generator not being explicitly included for that particular path.

The multi-rate adaptive filter functions to generate an interference cancellation signal from the signal components produced by the component generation system. In some implementations, the multi-rate adaptive filter may additionally function to perform sampling rate conversions (similarly to an upconverter 1030 or downconverter 1040, but applied to digital signals). The multi-rate adaptive filter preferably generates an interference cancellation signal by combining a weighted sum of signal components according to mathematical models adapted to model interference contributions of the transmitter, receiver, channel and/or other sources. Examples of mathematical models that may be used by the multi-rate adaptive filter include generalized memory polynomial (GMP) models, Volterra models, and Wiener-Hammerstein models; the multi-rate adaptive filter may additionally or alternatively use any combination or set of models.

The transform adaptor functions to set the transform configuration of the multi-rate adaptive filter and/or the component generation system. The transform configuration preferably includes the type of model or models used by the multi-rate adaptive filter as well as configuration details pertaining to the models (each individual model is a model type paired with a particular set of configuration details). For example, one transform configuration might set the multi-rate adaptive filter to use a GMP model with a particular set of coefficients. If the model type is static, the transform configuration may simply include model configuration details; for example, if the model is always a GMP model, the transform configuration may include only coefficients for the model, and not data designating the model type.

The transform configuration may additionally or alternatively include other configuration details related to the signal component generation system and/or the multi-rate adaptive filter. For example, if the signal component generation system includes multiple transform paths, the transform adaptor may set the number of these transform paths, which model order their respective component generators correspond to, the type of filtering used, and/or any other suitable details. In general, the transform configuration may include any details relating to the computation or structure of the signal component generation system and/or the multi-rate adaptive filter.

The transform adaptor preferably sets the transform configuration based on a feedback signal sampled from a signal post-interference-cancellation (i.e., a residue signal). For example, the transform adaptor may set the transform configuration iteratively to reduce interference present in a residue signal. The transform adaptor may adapt transform configurations and/or transform-configuration-generating algorithms using analytical methods, online gradient-descent methods (e.g., LMS, RLMS), and/or any other suitable methods. Adapting transform configurations preferably includes changing transform configurations based on learning. In the case of a neural-network model, this might include altering the structure and/or weights of a neural network based on test inputs. In the case of a GMP polynomial model, this might include optimizing GMP polynomial coefficients according to a gradient-descent method.

Note that TxDCs 1110 may share transform adaptors and/or other components (although each TxDC 1110 is preferably associated with its own transform configuration).

The TxAC 1120 functions to produce an analog interference cancellation signal from an analog input signal. The TxAC 1120 may be used to cancel interference in any signal, using any input, but the TxAC 1120 is preferably used to cancel transmit band interference in an analog receive signal. The TxAC 1120 may also be used to cancel transmit band signal components in a transmit signal sample (to perform transmit signal cleaning as previously described).

Using upconverters 1030, downconverters 1040, ADCs 1050, and DACs 1060, the TXAC 1120 may convert digital signals to analog input signals, and may additionally convert interference cancellation signals from analog to digital (or to another analog signal of different frequency).

The TXAC 1120 is preferably designed to operate at a single frequency band, but may additionally or alternatively be designed to operate at multiple frequency bands. The TXAC 1120 is preferably substantially similar to the circuits related to analog self-interference cancellation of U.S. patent application Ser. No. 14/569,354 (the entirety of which is incorporated by this reference); e.g., the RF self-interference canceller, the IF self-interference canceller, associated up/downconverters, and/or tuning circuits, except that the TXAC 1120 is not necessarily applied solely to cancellation of interference in a receive signal resulting from transmission of another signal (as previously described).

The TXAC 1120 is preferably implemented as an analog circuit that transforms an analog input signal into an analog interference cancellation signal by combining a set of filtered, scaled, and/or delayed versions of the analog input signal, but may additionally or alternatively be implemented as any suitable circuit. For instance, the TXAC 1120 may perform a transformation involving only a single version, copy, or sampled form of the analog input signal. The transformed signal (the analog interference cancellation signal) preferably represents at least a part of an interference component in another signal.

The TXAC 1120 is preferably adaptable to changing self-interference parameters in addition to changes in the input signal; for example, transceiver temperature, ambient temperature, antenna configuration, humidity, and transmitter power. Adaptation of the TXAC 1120 is preferably performed by a tuning circuit, but may additionally or alternatively be performed by a control circuit or other control mechanism included in the canceller or any other suitable controller (e.g., by the transform adaptor of the TxDC 1110).

Figure 10:
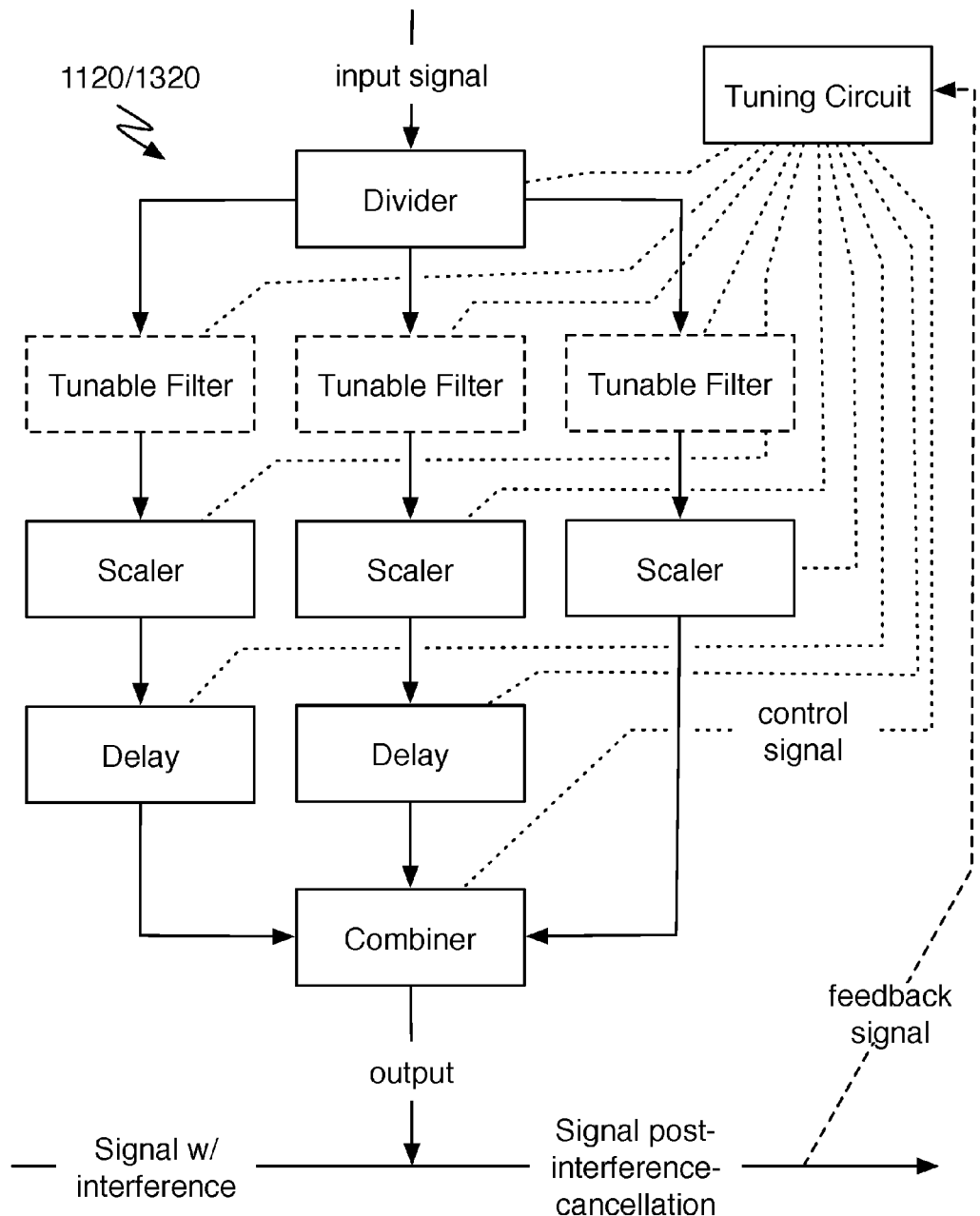
FIG. 10 is a diagram representation of an analog interference canceller of a system of a preferred embodiment.

In one implementation of a preferred embodiment, the TXAC 1120 includes a set of scalers (which may perform gain, attenuation, or phase adjustment), a set of delays, a signal combiner, a signal divider, and a tuning circuit, as shown in FIG. 10. In this implementation the TXAC 1120 may optionally include tunable filters (e.g., bandpass filters including an adjustable center frequency, lowpass filters including an adjustable cutoff frequency, etc.).

The tuning circuit preferably adapts the TXAC 1120 configuration (e.g., parameters of the filters, scalers, delayers, signal divider, and/or signal combiner, etc.) based on a feedback signal sampled from a signal after interference cancellation is performed (i.e., a residue signal). For example, the tuning circuit may set the TXAC 1120 configuration iteratively to reduce interference present in a residue signal. The tuning circuit preferably adapts configuration parameters using online gradient-descent methods (e.g., LMS, RLMS), but configuration parameters may additionally or alternatively be adapted using any suitable algorithm. Adapting configuration parameters may additionally or alternatively include alternating between a set of configurations. Note that TxACs may share tuning circuits and/or other components (although each TxAC 1120 is preferably associated with a unique configuration or architecture). The tuning circuit may be implemented digitally and/or as an analog circuit.

Figure 11:
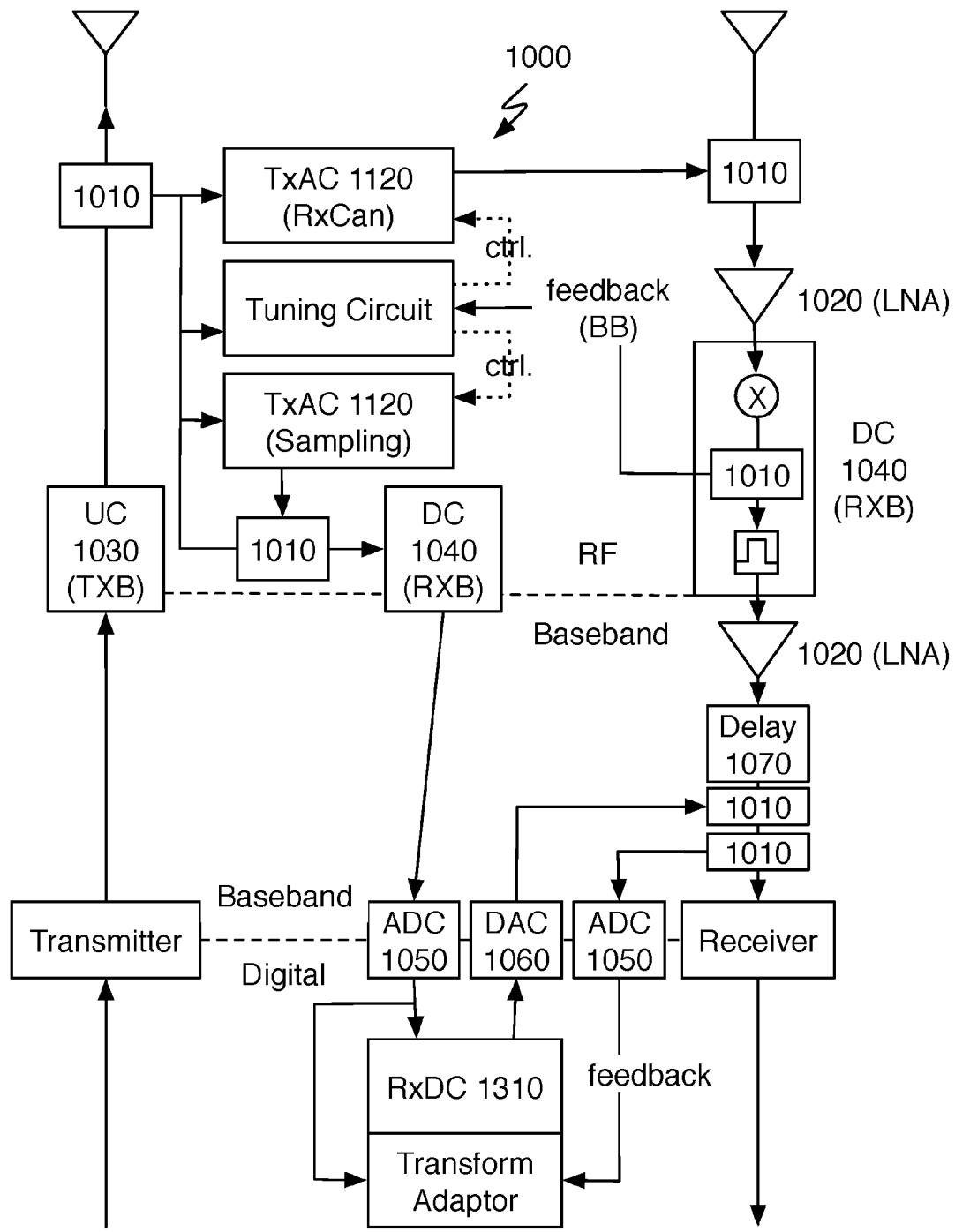
FIG. 11 is a diagram representation of a system of a preferred embodiment.

In one implementation of a preferred embodiment, the TxICS 1100 performs interference cancellation solely using analog cancellation, as shown in FIG. 11. In this implementation, the TxICS 1100 includes a TxAC 1120 (RxCan) used to cancel transmit band signal components present in the receive signal as well as a TXAC 1120 used to clean transmit signal samples (as previously described) for use by an RxICS 1300; both cancellers are controlled by a single tuning circuit, which receives input from both the transmit signal and from the residue signal. Note that as shown in FIG. 11, the tuning circuit takes a baseband feedback signal from the downconverter 1040 after mixing, but prior to final filtering. While it would also be possible for the tuning circuit to receive an RF feedback signal from before the downconverter 1040, note that in this implementation the filter of the downconverter 1040 may be used to remove transmit band signal components remaining after cancellation. Because the presence of these signal components prior to filtering is an indication of the performance of the RxCan TXAC 1120, it may be preferred for the tuning circuit to sample a residue signal prior to filtering that removes transmit band signal components. Alternatively, the tuning circuit may sample any signals at any point.

Figure 12:
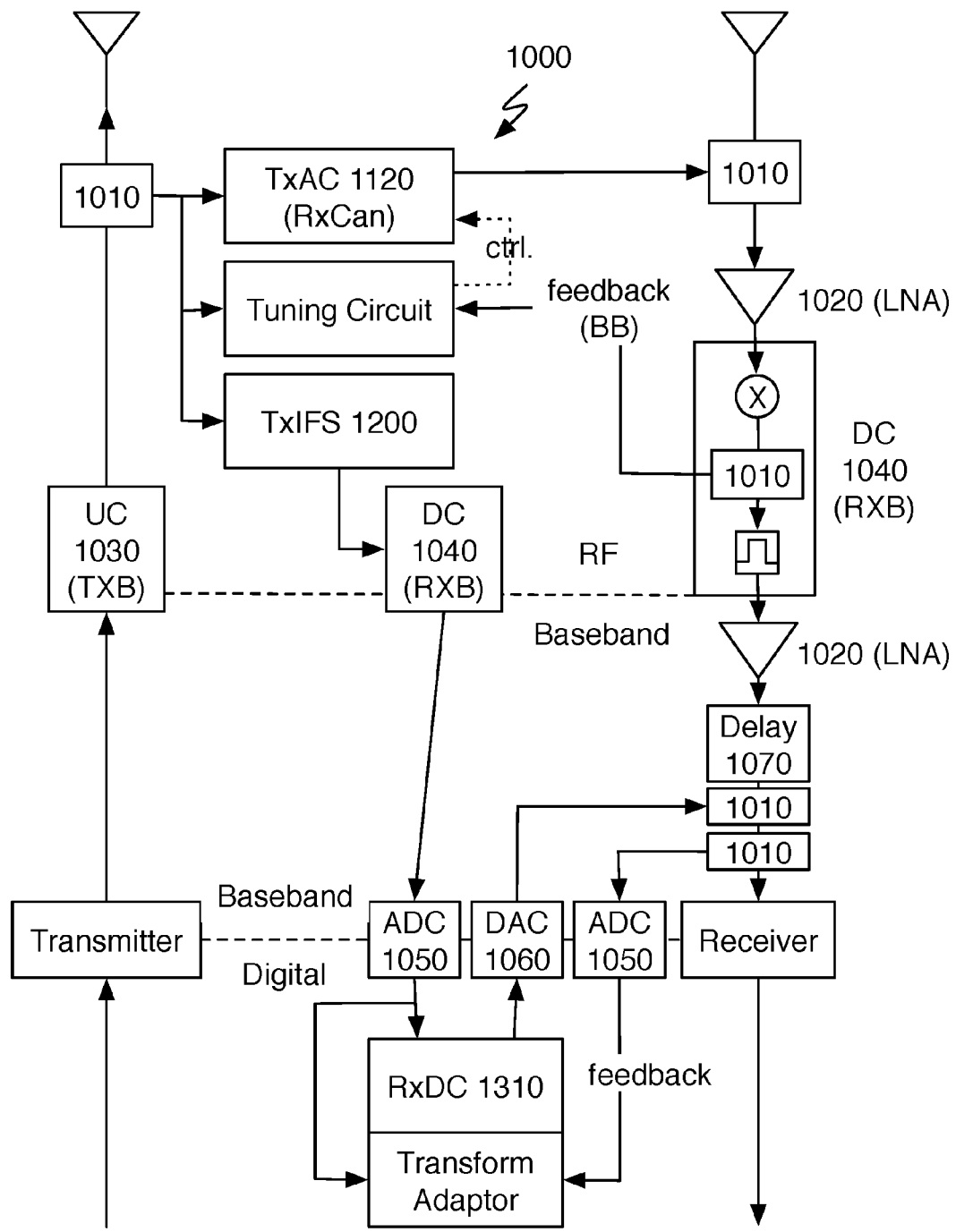
FIG. 12 is a diagram representation of a system of a preferred embodiment.

In a variation of this implementation, the system may utilize a combination of transmit band filtering (using TxIFS 1200) and cancellation, as shown in FIG. 12.

Figure 13:
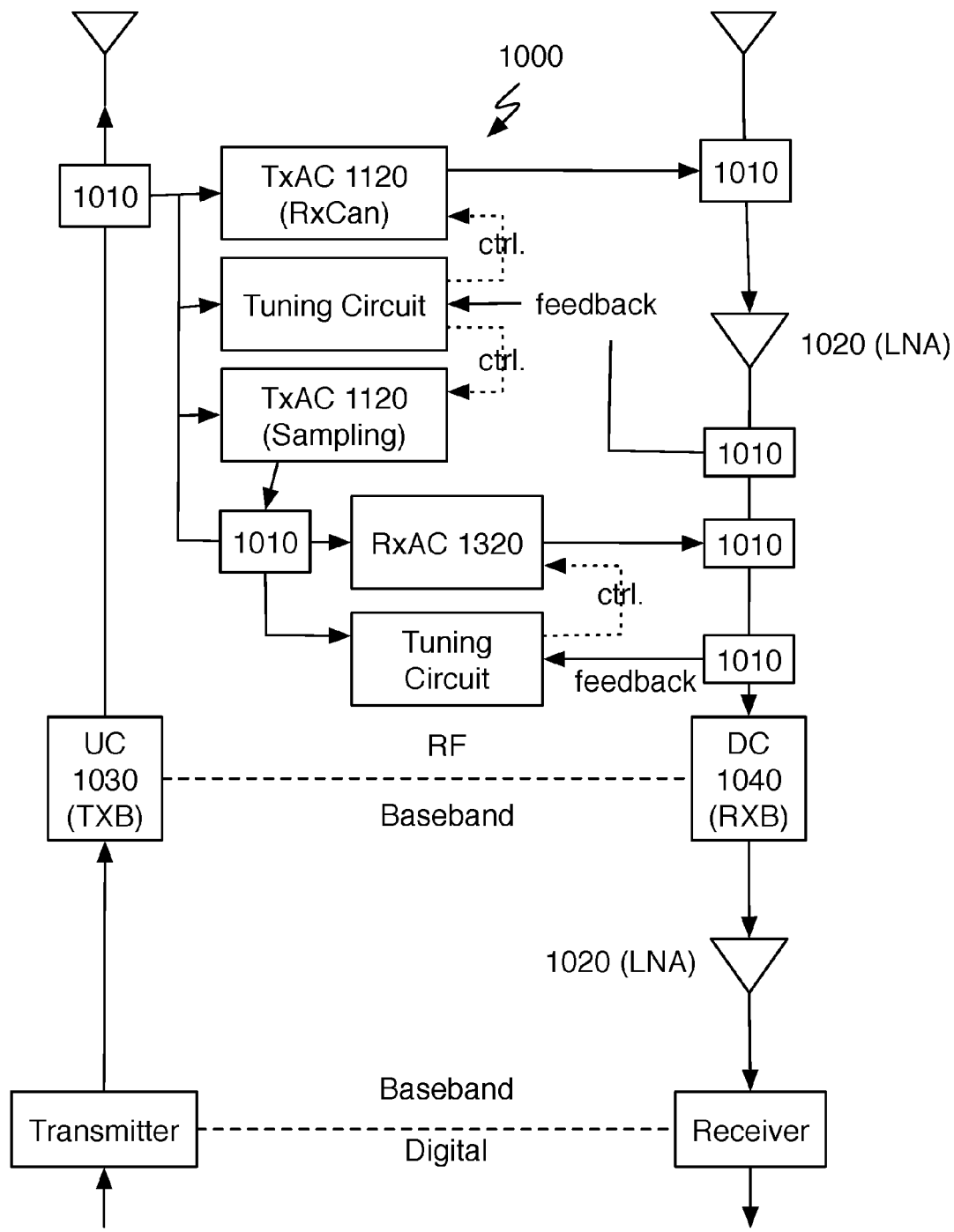
FIG. 13 is a diagram representation of a system of a preferred embodiment.
Figure 14:
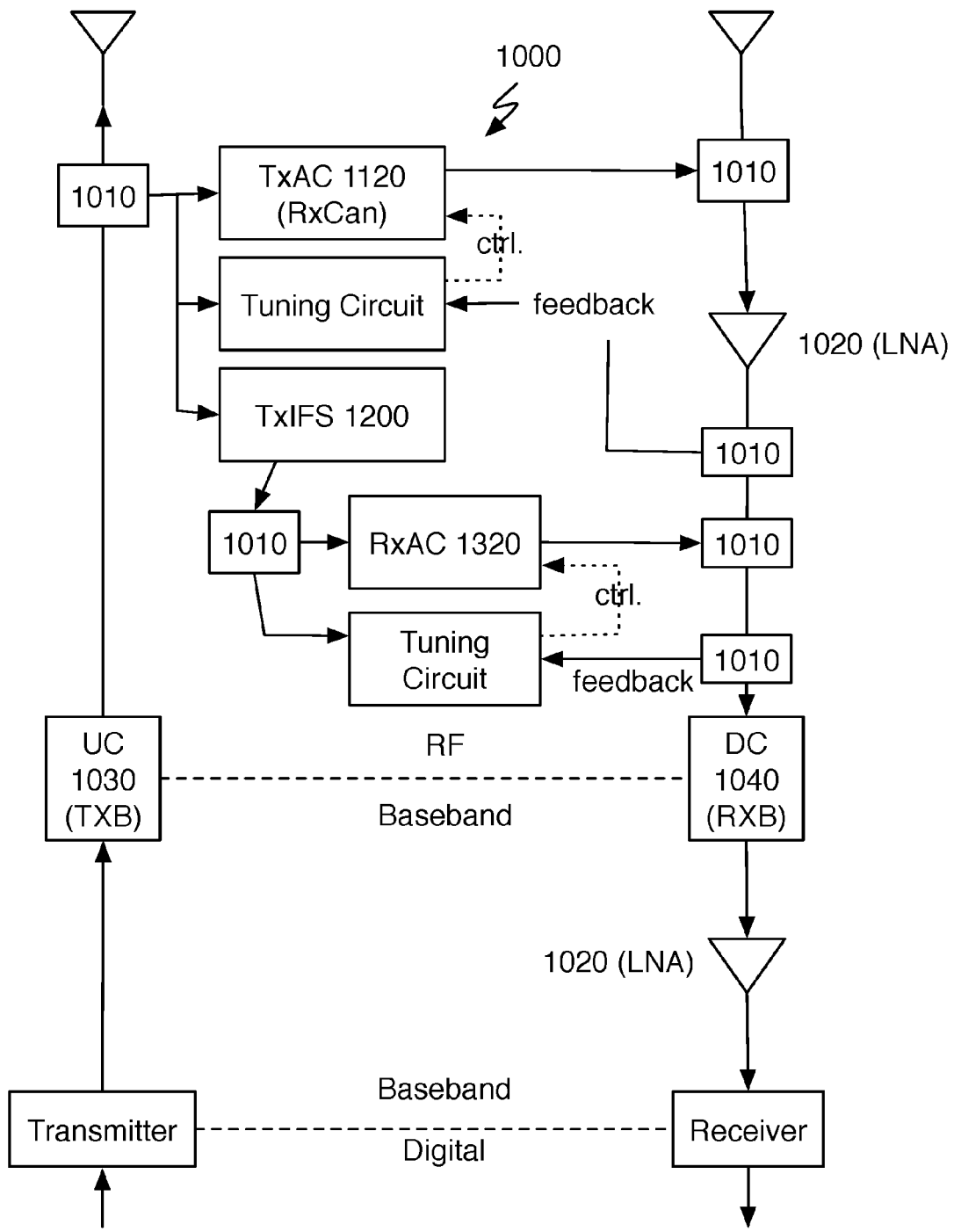
FIG. 14 is a diagram representation of a system of a preferred embodiment.

As shown in FIGS. 11 and 12, the RxICS 1300 (including an RxDC 1310 and associated components) is implemented digitally, but may additionally or alternatively be implemented in analog (including an RxAC 1320 and associated components), as shown in FIGS. 13 and 14. The TxICS 1100 and/or RxICS 1300 may be implemented in digital domains, analog domains, or a combination of the two.

Figure 15:
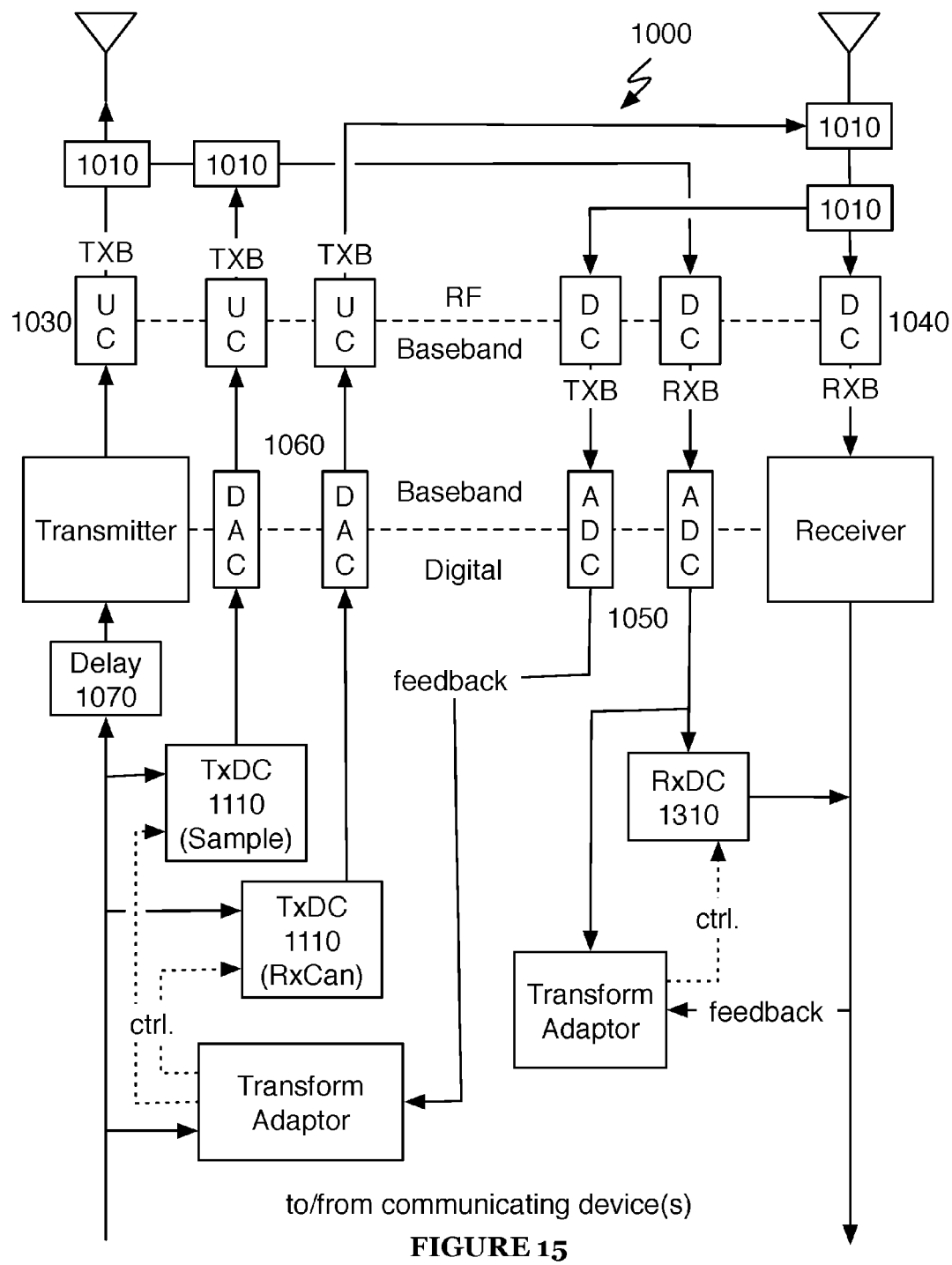
FIG. 15 is a diagram representation of a system of a preferred embodiment.

In one implementation of a preferred embodiment, the TxICS 1100 performs interference cancellation solely using digital cancellation, as shown in FIG. 15. In this implementation, the TxICS 1100 includes a TxDC 1110 (RxCan) used to cancel transmit band signal components present in the receive signal as well as a TxDC 1110 (Sample) used to clean transmit signal samples for use by an RxICS 1300; both cancellers are controlled by a single transform adaptor, which receives input from both the transmit signal and from the residue signal. Note that in this implementation, the RxDC 1310 receives an input signal derived from a combination of the upconverted output of the Sample TxDC 1110 with the upconverted transmit signal, but additionally or alternatively the RxDC 1310 may receive an input signal directly from the digital transmit path. As shown in FIGS. 11 and 12, the RxICS 1300 is implemented digitally, but may additionally or alternatively be implemented in analog, as shown in FIGS. 13 and 14. The TxICS 1100 and/or RxICS 1300 may be implemented in digital domains, analog domains, or a combination of the two.

Note that while as shown in these FIGURES, the TxCan and Sample cancellers sample the transmit signal on parallel paths, multiple cancellers of the TxICS 1100 may share switched signal paths (e.g., the coupler 1010 coupled to the transmit antenna in FIG. 11 may switch between the RxCan TxAC 1120 and the Sampling TXAC 1120).

The TxIFS 1200 functions to mitigate interference present in the transmit band of a signal by performing filtering in the transmit band. The TxIFS 1200 is preferably used to filter out interference present in the transmit band of a receive signal; e.g., the TxIFS 1200 includes a filter on the receive signal that allows signal components in the receive band to pass while blocking signal components in the transmit band.

The TxIFS 1200 may additionally or alternatively be used to filter out interference present in the transmit band of a transmit signal sample; e.g., to generate a transmit signal sample that includes primarily signal components in the receive band (as a way to estimate interference generated in the receive band of the receive signal by the transmit signal). Transmit samples cleaned in this way may be used to perform receive-band interference cancellation, typically using the RxICS 1300.

The TxIFS 1200 preferably includes one or more tunable bandpass filters. Alternatively, the TxIFS 1200 may include any type of filter. For example, the TxIFS 1200 may include a notch filter to remove transmit band signal components only. Filters of the TxIFS 1200 are preferably used for RF signals, but may additionally or alternatively be used for any frequency analog signal.

Filters of the TxIFS 1200 preferably transform signal components according to the response of the filter, which may introduce a change in signal magnitude, signal phase, and/or signal delay. Filters of the TxIFS 1200 are preferably formed from a combination (e.g., in series and/or in parallel) of resonant elements. Resonant elements of the filters are preferably formed by lumped elements, but may additionally or alternatively be distributed element resonators, ceramic resonators, SAW resonators, crystal resonators, cavity resonators, or any suitable resonators.

Filters of the TxIFS 1200 are preferably tunable such that one or more peaks of the filters may be shifted. In one implementation of a preferred embodiment, one or more resonant elements of a filter may include a variable shunt capacitance (e.g., a varactor or a digitally tunable capacitor) that enables filter peaks to be shifted. Additionally or alternatively, filters may be tunable by quality factor (i.e., Q may be modified by altering circuit control values), or filters may be not tunable. Filters 145 may include, in addition to resonant elements, delayers, phase shifters, and/or scaling elements. The filters are preferably passive filters, but may additionally or alternatively be active filters. The filters are preferably implemented with analog circuit components, but may additionally or alternatively be digitally implemented. The center frequency of any tunable peak of a filter is preferably controlled by a tuning circuit, but may additionally or alternatively be controlled by any suitable system (including manually controlled, e.g. as in a mechanically tuned capacitor).

In some implementations, the system can include both a TxIFS 1200 and a TxICS 1100 that are cooperatively operated. For example, the TxIFS 1200 may include a filter with a tunable quality factor, and TxICS 1100 operation may be tuned based on the quality factor of the filter (e.g., selection of a lower quality factor may cause the TxICS 1100 to be adaptively configured to reduce interference over a wider range of signal components). In another example, the TxIFS 1200 and TxICS 1100 may be each be switched in and out of the receive and transmit path, respectively (e.g., the TxIFS is switched into the receive path when the TxICS is switched out of the transmit path, and vice versa). The TxIFS 1200 and/or TxICS 1100 may additionally or alternatively be configured in any suitable manner.

The RxICS 1300 functions to mitigate interference present in the receive band of a signal using self-interference cancellation techniques; that is, generating a self-interference cancellation signal by transforming signal samples of a first signal (typically a transmit signal) into a representation of self-interference present in another signal, due to transmission of the first signal (e.g., a receive signal, a transmit signal after amplification, etc.) and then subtracting that interference cancellation signal from the other signal.

The RxICS 1300 is preferably used to cancel interference present in the receive band of a receive signal; i.e., the RxICs 1300 generates an interference cancellation signal from samples of receive band components of a transmit signal using a circuit that models the representation of the transmit signal, in the receive band, as received by a receiver, and subtracts that cancellation signal from the receive signal.

The RxICS 1300 preferably receives as input samples of a transmit signal that has been filtered (e.g., by the TxIFS 1200) or interference cancelled (e.g., by the TxICS 1100) to reduce the presence of transmit band components (allowing for better estimation of interference due to signal components of the transmit signal that are in the receive band).

The RxICS 1300 preferably cancels interference on a receive signal that has already experienced transmit band cancellation and/or filtering, but additionally or alternatively, the RxICS 1300 may cancel interference on a receive signal that has not experienced transmit band cancellation or filtering.

The RxICS 1300 comprises at least one of a digital RX interference canceller (RxDC) 1310 and an analog RX interference canceller (RxAC) 1320.

The RxDC 1310 is preferably substantially similar to the TxDC 1110, but may additionally or alternatively be any suitable digital interference canceller.

The RxAC 1320 is preferably substantially similar to the TxAC 1120, but may additionally or alternatively be any suitable analog interference canceller.

The RxIFS 1400 functions to mitigate interference present in the receive band of a transmit signal by performing filtering in the receive band. The RxIFS 1400, if present, functions to remove receive-band signal components in a transmit signal prior to transmission (but preferably post-power-amplification). Filters of the RxIFS 1400 are preferably substantially similar to those of the TxIFS 1200, but the RxIFS may additionally or alternatively include any suitable filters.

In some implementations, the system can include both an RxIFS 1400 and an RxICS 1300 that are cooperatively operated. For example, the RxIFS 1400 may include a filter with a tunable quality factor, and RxICS 1300 operation may be tuned based on the quality factor of the filter (e.g., selection of a lower quality factor may cause the RxICS 1300 to be adaptively configured to reduce interference over a wider range of signal components). In another example, the RxIFS 1400 and RxICS 1300 may be each be switched in and out of the transmit and receive path, respectively (e.g., the RxIFS is switched into the transmit path when the RxICS is switched out of the receive path, and vice versa). The RxIFS 1400 and/or RxICS 1300 may additionally or alternatively be configured in any suitable manner.

In some implementations, the system can include a TxICS 1100, TxIFS 1200, RxICS 1300, and RxIFS 1400. Each of the TxICS, TxIFS, RxICS, and RxIFS may be controlled based on the performance and/or operation of any of the other subsystems, or alternatively based on any suitable conditions. For example, the TxIFS 1200 may include a filter with an adjustable Q-factor, and the RxICS 1300 may include a transform adaptor that is controlled according to the Q-factor of the filter of the TxIFS 1200 (e.g., adjusting the filter to a high Q-factor corresponds to a transform configuration that removes signal components in a narrow frequency band corresponding to the pass band of the filter).

The methods of the preferred embodiment and variations thereof can be embodied and/or implemented at least in part as a machine configured to receive a computer-readable medium storing computer-readable instructions. The instructions are preferably executed by computer-executable components preferably integrated with a system for wireless communication. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system for out-of-band interference mitigation comprising:
   a transmit coupler, communicatively coupled to an RF transmit signal of a communication system, that samples the RF transmit signal to create a sampled RF transmit signal; wherein the RF transmit signal has a first RF carrier frequency in a transmit band;
   a transmit analog canceller that transforms, according to a first configuration state, the sampled RF transmit signal to a first RF interference cancellation signal;
   a first receive coupler, communicatively coupled to an RF receive signal of the communication system having a second RF carrier frequency in a receive band, that combines, in order to remove a first portion of interference in the transmit band, the first RF interference cancellation signal and the RF receive signal to generate a composite RF receive signal;
a sampling analog canceller that transforms, according to a second configuration state, the sampled RF transmit signal to a second RF interference cancellation signal;
a cleaning coupler that combines, in order to remove interference in the transmit band, the sampled RF transmit signal and the second RF interference cancellation signal to generate a cleaned transmit signal;
a first frequency downconverter that converts the cleaned transmit signal to a BB transmit signal having a BB frequency, wherein the BB frequency is less than the first RF carrier frequency;
a second frequency downconverter that converts the composite RF receive signal to a composite BB receive signal;
an analog-to-digital converter that converts the BB transmit signal to a digital transmit signal;
a digital canceller that transforms the digital transmit signal to a digital interference cancellation signal;
a digital-to-analog converter that converts the digital interference cancellation signal to a digitally-sourced interference cancellation signal; and
a second receive coupler that combines, in order to remove a second portion of interference in the receive band, the digitally-sourced interference cancellation signal and the composite BB receive signal.

2. The system of claim 1, further comprising a tuning circuit, wherein the tuning circuit receives the composite BB receive signal from the receive path, and wherein the tuning circuit sets the first configuration state and the second configuration state based on changes in the composite BB receive signal.

3. The system of claim 1, wherein the transmit band and the receive band are non-overlapping.

4. The system of claim 1, wherein the digital canceller comprises:
an adaptive filter that transforms the digital composite transmit signal into the digital cancellation signal according to a transform configuration;
a receive analog-to-digital converter that converts the baseband composite receive signal to a digital feedback signal; and
a transform adaptor that dynamically sets the transform configuration in response to changes in the digital feedback signal.

5. The system of claim 1, wherein the transmit analog canceller and the sampling analog canceller each comprise a signal divider, a set of scalers and delayers, and a signal combiner.

6. A system for out-of-band interference mitigation comprising:
a transmit coupler, communicatively coupled to a transmit signal of a communication system, that samples the transmit signal to create a sampled transmit signal; wherein the transmit signal has a first center frequency in a transmit band and a signal power in the transmit band;
a first canceller that transforms the sampled transmit signal to a first interference cancellation signal and a cleaned transmit signal; wherein the cleaned transmit signal has a reduced signal power in the transmit band;
a first receive coupler, communicatively coupled to a receive signal of the communication system having a second center frequency in a receive band, that combines, in order to remove a first portion of interference in the transmit band, the first interference cancellation signal and the receive signal to produce a first composite receive signal;
a second canceller that generates a second interference cancellation signal based on the cleaned transmit signal;
a second receive coupler, communicatively coupled to the receive path, that combines, in order to remove a second portion of interference in the receive band, the second interference cancellation signal and the first composite receive signal; and
a tuning circuit; wherein the first canceller transforms the sampled transmit signal to the first interference cancellation signal according to a configuration state; wherein the tuning circuit dynamically sets the configuration state in response to changes in the first composite receive signal.

7. The system of claim 6, wherein the transmit band and the receive band are non-overlapping.

8. The system of claim 7, further comprising a receive-band filter, communicatively coupled to the transmit path between the transmit coupler and a transmit antenna, that filters the transmit signal to remove signal components of the transmit signal within the receive band.

9. The system of claim 6, wherein the transmit signal is a digital transmit signal, wherein the first canceller is a first digital canceller, wherein the first interference cancellation signal is a first digital interference cancellation signal, wherein the second canceller is a second digital canceller, and wherein the second interference cancellation signal is a second digital interference cancellation signal.

10. The system of claim 9, wherein the first digital canceller comprises:
a signal component generation system, coupled to the digital transmit signal, that generates a set of signal components from the digital transmit signal;
a multi-rate adaptive filter that transforms the set of signal components into the first digital interference cancellation signal according to a transform configuration; and
a transform adaptor that dynamically sets the transform configuration in response to changes in the first composite receive signal.

11. The system of claim 9, further comprising:
a first digital-to-analog converter (DAC) that converts the first digital interference cancellation signal to a first digitally-sourced baseband cancellation signal; and
a first frequency upconverter that converts the first digitally-sourced baseband cancellation signal to a first digitally-sourced RF cancellation signal; wherein the first receive coupler combines the first digitally-sourced RF cancellation signal with the receive signal to produce the first composite receive signal.

12. The system of claim 11, wherein the first digital canceller further comprises a second digital-to-analog converter (DAC) and second frequency upconverter; wherein the first digital canceller generates the cleaned transmit signal by generating a transmit cancellation signal, converting the transmit cancellation signal from a digital signal to an RF signal, and combining the RF transmit cancellation signal with the transmit signal at RF; wherein the system further comprises a frequency downconverter and analog-to-digital converter (ADC) that convert the cleaned RF transmit signal to a cleaned digital transmit signal; wherein the second digital canceller generates the second digital interference cancellation signal based on the cleaned digital transmit signal.

13. The system of claim 12, wherein the second receive coupler combines the second digital interference cancellation signal and a digital composite receive signal; and wherein the second digital canceller generates the second digital interference cancellation signal based on the digital input signal and in response to changes in the digital composite receive signal.

14. The system of claim 6, wherein the first interference canceller is a first analog canceller, and wherein the second interference canceller is a second analog canceller.

15. The system of claim 14, wherein each of the first and second analog cancellers comprise a signal divider, a set of scalers and delayers, and a signal combiner.

16. The system of claim 14, wherein the first interference cancellation signal has a center frequency that is substantially identical to the center frequency of the transmit signal, and the second interference cancellation signal has a center frequency that is substantially identical to the center frequency of the receive signal.

17. The system of claim 6, wherein the first interference canceller comprises an analog canceller, and wherein the second interference canceller comprises a digital canceller.

18. The system of claim 17, the digital canceller further comprising:

a frequency downconverter that converts the cleaned transmit signal to a baseband cleaned transmit signal;

a first analog-to-digital converter (ADC) that converts the baseband cleaned transmit signal to a digital cleaned transmit signal;

a signal component generation system, coupled to the digital cleaned transmit signal, that generates a set of signal components from the cleaned transmit signal;

a multi-rate adaptive filter that transforms the set of signal components into a digital interference cancellation signal according to a transform configuration;

a digital-to-analog converter (DAC) that converts the digital interference cancellation signal to the second interference cancellation signal.

19. The system of claim 18, wherein the second receive coupler combines the second interference cancellation signal and the first composite receive signal to produce a second composite receive signal, and further comprising a transform adaptor that dynamically sets the transform configuration of the digital canceller in response to changes in the second composite receive signal.

* * * * *